United States Patent
Uemukai et al.

(10) Patent No.: US 8,279,343 B2
(45) Date of Patent: Oct. 2, 2012

(54) SUMMARY CONTENT GENERATION DEVICE AND COMPUTER PROGRAM

(75) Inventors: Toshiaki Uemukai, Fujimino (JP); Kazunori Matsumoto, Fujimino (JP); Fumiaki Sugaya, Fujimino (JP)

(73) Assignee: KDDI Corporation, Tokyo (JP)

( * ) Notice: Subject to any disclaimer, the term of this patent is extended or adjusted under 35 U.S.C. 154(b) by 932 days.

(21) Appl. No.: 12/211,488

(22) Filed: Sep. 16, 2008

(65) Prior Publication Data

US 2009/0073314 A1    Mar. 19, 2009

(30) Foreign Application Priority Data

Sep. 18, 2007  (JP) .................................. 2007-241371

(51) Int. Cl. *H04N 7/08* (2006.01)
(52) U.S. Cl. ........ 348/468; 348/461; 348/465; 348/563; 725/40
(58) Field of Classification Search ................. 348/468, 348/461, 465, 473, 563, 564; 725/137, 40, 725/41

See application file for complete search history.

(56) References Cited

U.S. PATENT DOCUMENTS

| | | | | |
|---|---|---|---|---|
| 7,149,957 B2 * | 12/2006 | Hull et al. | ...................... | 715/200 |
| 7,757,252 B1 * | 7/2010 | Agasse | ........................... | 725/41 |
| 2009/0009661 A1 * | 1/2009 | Murakami et al. | ............ | 348/468 |

FOREIGN PATENT DOCUMENTS

| | | |
|---|---|---|
| JP | 06-030385 A | 2/1994 |
| JP | 07-192003 | 7/1995 |
| JP | 09-074390 A | 3/1997 |
| JP | 2004-088384 A | 3/2004 |
| JP | 2004-336606 A | 11/2004 |
| JP | 2005-236993 A | 9/2005 |
| JP | 2006-003875 A | 1/2006 |
| JP | 2006-135387 A | 5/2006 |
| JP | 2007-006308 | 1/2007 |
| JP | 2008-098955 A | 4/2008 |
| WO | 2006/048963 A1 | 5/2006 |

OTHER PUBLICATIONS

Office Action of JP Application. No. 2007-241371 dated Jun. 19, 2012.

* cited by examiner

*Primary Examiner* — Jefferey Harold
*Assistant Examiner* — Jean W Desir
(74) *Attorney, Agent, or Firm* — Morgan, Lewis & Bockius LLP

(57) ABSTRACT

When generating animation content as summary content for a digital broadcast program, the timing for switching of animation images for display is controlled appropriately. Subtitle character string extraction means for extracting a subtitle character string from subtitle data contained in digital broadcast signals, still image extraction means for extracting one still image corresponding to the subtitle character string, and summary content generation means for generating summary content to display the extracted subtitle character strings together with the corresponding extracted still images, are provided; the summary content generation means decides the timing for switching display of the plurality of subtitle character strings and still images comprised by the summary content, based on the subtitle character strings.

21 Claims, 18 Drawing Sheets

| SUBTITLE NO | DISPLAY TIME | SUBTITLE CHARACTER STRING | FRAME IMAGE NO SERIES |
|---|---|---|---|
| $C_1$ | 00:01:01 | $T_1$ | $F_1,\ldots,F_5$ |
| $C_2$ | 00:01:04 | $T_2$ | $F_6,\ldots,F_9$ |
| $C_3$ | 00:01:11 | $T_3$ | $F_{10},\ldots,F_{15}$ |
| $C_4$ | 00:01:19 | $T_4$ | $F_{16},\ldots$ |
| $C_5$ | 00:01:29 | $T_5$ | ... |
| $C_6$ | 00:01:35 | $T_6$ | ... |
| $C_7$ | 00:01:37 | $T_7$ | ... |
| ... | ... | ... | ... |

FIG. 5

| SUBTITLE NO | DISPLAY TIME | SUBTITLE CHARACTER STRING | FRAME IMAGE NO SERIES | SUMMARY STILL IMAGE NO |
|---|---|---|---|---|
| $c_1$ | 00:01:01 | $T_1$ | – | – |
| $c_2$ | 00:01:04 | $T_2$ | – | – |
| $c_3$ | 00:01:11 | $T_3$ | – | – |
| $c_4$ | 00:01:19 | $T_4$ | – | – |
| $c_5$ | 00:01:29 | $T_5$ | – | – |
| $c_6$ | 00:01:35 | $T_6$ | – | – |
| $c_7$ | 00:01:37 | $T_7$ | – | – |
| $c_8$ | 00:01:45 | $T_8$ | – | – |
| $c_9$ | 00:01:50 | $T_9$ | – | – |
| $c_{10}$ | 00:01:54 | $T_{10}$ | – | – |
| $c_{11}$ | 00:02:00 | $T_{11}$ | – | – |
| $c_{12}$ | 00:02:10 | $T_{12}$ | – | – |
| ... | ... | ... | ... | ... |

| SUBTITLE NO | DISPLAY TIME | SUBTITLE CHARACTER STRING | FRAME IMAGE NO SERIES | SUMMARY STILL IMAGE NO |
|---|---|---|---|---|
| $C_1$ | 00:01:01 | $T_1+T_2$ | – | – |
| $C_2$ | – | – | – | – |
| $C_3$ | 00:01:11 | $T_3$ | – | – |
| $C_4$ | 00:01:19 | $T_4$ | – | – |
| $C_5$ | 00:01:29 | $T_5$ | – | – |
| $C_6$ | 00:01:35 | $T_6+T_7$ | – | – |
| $C_7$ | – | – | – | – |
| $C_8$ | 00:01:45 | $T_8$ | – | – |
| $C_9$ | 00:01:50 | $T_9$ | – | – |
| $C_{10}$ | 00:01:54 | $T_{10}$ | – | – |
| $C_{11}$ | 00:02:00 | $T_{11}$ | | |
| $C_{12}$ | 00:02:10 | $T_{12}$ | | |
| ⋮ | ⋮ | ⋮ | ⋮ | ⋮ |

| SUBTITLE NO | DISPLAY TIME | SUBTITLE CHARACTER STRING | FRAME IMAGE NO SERIES | SUMMARY STILL IMAGE NO |
|---|---|---|---|---|
| $C_1$ | 00:01:01 | $T_1+T_2$ | — | — |
| $C_2$ | — | — | — | — |
| $C_3$ | 00:01:11 | $T_3$ | — | — |
| $C_4$ | 00:01:19 | $T_4$ | — | — |
| $C_5$ | 00:01:29 | $T_5$ | — | — |
| $C_6$ | 00:01:35 | $T_6+T_7$ | — | — |
| $C_7$ | — | — | — | — |
| $C_8$ | 00:01:45 | $T_8'$ | — | — |
| $C_9$ | 00:01:50 | $T_8''$ | — | — |
| $C_{10}$ | — | — | — | — |
| $C_{11}$ | 00:02:00 | $T_{11}$ | — | — |
| $C_{12}$ | 00:02:10 | $T_{12}$ | — | — |
| ⋮ | ⋮ | ⋮ | ⋮ | ⋮ |

| SUBTITLE NO | DISPLAY TIME | SUBTITLE CHARACTER STRING | FRAME IMAGE NO SERIES | SUMMARY STILL IMAGE NO |
|---|---|---|---|---|
| $c_1$ | 00:01:01 | $T_1+T_2$ | 905-1074 | — |
| $c_2$ | — | — | — | — |
| $c_3$ | 00:01:11 | $T_3$ | 1054-1194 | — |
| $c_4$ | 00:01:19 | $T_4$ | 1175-1344 | — |
| $c_5$ | 00:01:29 | $T_5$ | 1325-1434 | — |
| $c_6$ | 00:01:35 | $T_6+T_7$ | 1415-1584 | — |
| $c_7$ | — | — | — | — |
| $c_8$ | 00:01:45 | $T_8+T_9+T_{10}$ | 1565-1959 | — |
| $c_9$ | — | — | — | — |
| $c_{10}$ | — | — | — | — |
| $c_{11}$ | — | — | — | — |
| $c_{12}$ | 00:02:10 | $T_{12}$ | 1940-2080 | — |
| ... | ... | ... | ... | ... |

| SUBTITLE NO | DISPLAY TIME | SUBTITLE CHARACTER STRING | FRAME IMAGE NO SERIES | SUMMARY STILL IMAGE NO |
|---|---|---|---|---|
| $c_1$ | 00:01:01 | $T_1+T_2$ | 905-1074 | - |
| $c_2$ | - | - | - | - |
| $c_3$ | 00:01:11 | $T_3$ | 1054-1194 | - |
| $c_4$ | 00:01:19 | $T_4$ | 1175-1344 | - |
| $c_5$ | 00:01:29 | $T_5$ | 1325-1434 | - |
| $c_6$ | 00:01:35 | $T_6+T_7$ | 1415-1584 | - |
| $c_7$ | - | - | - | - |
| $c_8$ | 00:01:45 | $T_8+T_9+T_{10}$ | 1585-1959 | - |
| $c_9$ | - | - | - | - |
| $c_{10}$ | - | - | - | - |
| $c_{11}$ | - | - | - | - |
| $c_{12}$ | 00:02:10 | $T_{12}$ | 1940-2080 | - |
| ... | ... | | | ... |

| SUBTITLE NO | DISPLAY TIME | SUBTITLE CHARACTER STRING | FRAME IMAGE NO SERIES | SUMMARY STILL IMAGE NO |
|---|---|---|---|---|
| $c_1$ | 00:01:01 | $T_1+T_2$ | 905-1074 | 1011 |
| $c_2$ | - | - | - | - |
| $c_3$ | 00:01:11 | $T_3$ | 1054-1194 | 1189 |
| $c_4$ | 00:01:19 | $T_4$ | 1175-1344 | 1278 |
| $c_5$ | 00:01:29 | $T_5$ | 1325-1434 | 1379 |
| $c_6$ | 00:01:35 | $T_6+T_7$ | 1415-1584 | 1430 |
| $c_7$ | - | - | - | - |
| $c_8$ | 00:01:45 | $T_8+T_9+T_{10}$ | 1585-1959 | 1824 |
| $c_9$ | - | - | - | - |
| $c_{10}$ | - | - | - | - |
| $c_{11}$ | - | - | - | - |
| $c_{12}$ | 00:02:10 | $T_{12}$ | 1940-2080 | 1976 |
| ... | ... | ... | ... | ... |

| SUBTITLE NO | DISPLAY TIME | SUBTITLE CHARACTER STRING | FRAME IMAGE NO SERIES | SUMMARY STILL IMAGE NO |
|---|---|---|---|---|
| $c_1$ | 00:01:01 | $T_1+T_2$ | 905-1074 | 1011 |
| $c_2$ | - | - | - | - |
| $c_3$ | 00:01:11 | $T_3$ | 1054-1194 | 1189 |
| $c_4$ | 00:01:19 | $T_4$ | 1175-1344 | - |
| $c_5$ | 00:01:29 | $T_5$ | 1325-1434 | 1379 |
| $c_6$ | 00:01:35 | $T_6+T_7$ | 1415-1584 | 1430 |
| $c_7$ | - | - | - | - |
| $c_8$ | 00:01:45 | $T_8+T_9+T_{10}$ | 1585-1959 | 1824 |
| $c_9$ | - | - | - | - |
| $c_{10}$ | - | - | - | - |
| $c_{11}$ | - | - | - | - |
| $c_{12}$ | 00:02:10 | $T_{12}$ | 1940-2080 | 1976 |
| ... | ... | ... | ... | ... |

| SUBTITLE NO | DISPLAY TIME | SUBTITLE CHARACTER STRING | FRAME IMAGE NO SERIES | SUMMARY STILL IMAGE NO | REPRODUCTION TIME |
|---|---|---|---|---|---|
| $C_1$ | 00:01:01 | $T_1+T_2$ | 905-1074 | 1011 | 00:00:00 |
| $C_2$ | - | - | - | - | - |
| $C_3$ | 00:01:11 | $T_3$ | 1054-1194 | 1189 | 00:00:02 |
| $C_4$ | 00:01:19 | $T_4$ | 1175-1344 | - | 00:00:04 |
| $C_5$ | 00:01:29 | $T_5$ | 1325-1434 | 1379 | 00:00:06 |
| $C_6$ | 00:01:35 | $T_6+T_7$ | 1415-1584 | 1430 | 00:00:08 |
| $C_7$ | - | - | - | - | - |
| $C_8$ | 00:01:45 | $T_8+T_9+T_{10}$ | 1585-1959 | 1824 | 00:00:10 |
| $C_9$ | - | - | - | - | - |
| $C_{10}$ | - | - | - | - | - |
| $C_{11}$ | - | - | - | - | - |
| $C_{12}$ | 00:02:10 | $T_{12}$ | 1940-2080 | 1976 | 00:00:14 |
| ... | ... | ... | ... | ... | ... |

100

SUMMARY CONTENT GENERATION DEVICE AND COMPUTER PROGRAM

BACKGROUND OF THE INVENTION

1. Field of the Invention

This invention relates to a summary content generation device and to a computer program, which generate summary content for broadcast programs in digital terrestrial broadcasting and other digital broadcasting.

Priority is claimed on Japanese Patent Application No. 2007-241371, filed Sep. 18, 2007, the content of which is incorporated herein by reference.

2. Description of the Related Art

In digital terrestrial broadcast services, subtitle information (closed-caption information) is delivered simultaneously in addition to video data. Subtitles are information used to superpose program dialogue, spoken lines, and similar onto the television images, so that, for example, even persons who are hard of hearing can enjoy broadcasts. While reproducing video data and audio data among the received digital terrestrial broadcast data, a digital terrestrial broadcast reception terminal, upon receiving subtitle data in the broadcast data, superposes the subtitle data on the reproduced video data. As digital terrestrial broadcast reception terminals, in addition to home-use television receivers, there are also terminals which employ personal computers and portable telephone sets. In particular, digital terrestrial broadcast service for portable telephone sets is called "1seg". In this 1seg service, subtitles are always displayed, and viewing is possible without listening to audio even on trains or in other public places. Specifications for these services are stipulated by standards of ARIB (Association of Radio Industries and Businesses).

Further, among digital terrestrial broadcast reception terminals are devices comprising functions to store received broadcast data in hard disk devices or other storage media; by this means, a viewer can view a broadcast program at any time by reproducing the stored broadcast data. Hereafter, with increasing storage area capacities and falling costs, it is anticipated that it will become possible to store all the programs broadcast over one week or a longer period on a plurality of broadcast channels.

However, it is thought that, due to available time constraints, many viewers view only a portion of broadcast programs among the broadcast programs accumulated in a storage area. Moreover, while there are cases in which a single broadcast program is reproduced and viewed completely from beginning to end, there are also cases in which only a synopsis of a broadcast program is checked. When checking only a synopsis, for example, there is a method in which while fast-forwarding during reproduction, only scenes which the viewer wishes to view are reproduced normally; however, this method requires that the viewer view the fast-forwarded television images and perform operations while watching closely, requires time, and is troublesome.

Hence expectations are mounting for technology to facilitate understanding, by simple means, of the content of a single broadcast program in a short amount of time. Methods to facilitate understanding of program content include a method of extracting partial video data from the original video data to generate concatenated summary video content, and a method of extracting still images from the original video data to generate summary thumbnail content which displays a list of images. On the other hand, while there have been advances toward larger storage area capacities, the amount of data which can be accumulated is limited, and so it is desired that the data size of summary video content be as small as possible, and it is also desired that the number of images of summary thumbnail content be as small as possible.

In Patent Reference 1, a method is proposed in which measures are taken such that program content can be ascertained, and at the same time searching for a desired scene can be performed, and reproduction of video from that scene is possible. In the technology of the prior art disclosed in this Patent Reference 1, images in which subtitles are displayed are extracted from video data, and are converted into thumbnails. Then, when the viewer selects an image displayed in a list, video is reproduced from that position.

In Patent Reference 2, a method is proposed in which animation images which summarize program content are generated. In the technology of the prior art disclosed in this Patent Reference 2, images and subtitles are extracted from video, and image groups combining these are continuously switched as animation images, to generate summary content. Images used in these animation images are frame images at the time of reception of subtitles, at the time received subtitles exceed a fixed data amount, at the time a video scene changes, or at the time a fixed length of time has elapsed. Further, in order to reduce the size of summary content, image processing is performed to extract only the outlines of extracted images.

Patent Reference 1: Japanese Unexamined Patent Application, First Publication No. 7-192003

Patent Reference 2: Japanese Unexamined Patent Application, First Publication No. 2007-006308

However, in the technology of the prior art disclosed in Patent Reference 1 above, images extracted from video are merely displayed as thumbnails in a list, and as the number of images increases, the convenience of use as a list is greatly worsened. Further, in displaying a list of thumbnails, it is necessary to assume viewing using a display device with a display of a certain size, detracting from general applicability. In particular, when using portable telephone sets, which are presently in wide use, the screen size is small in order to enhance portability, and so it is difficult to view a list of thumbnails with satisfactory perceptibility.

In the technology of the prior art disclosed in Patent Reference 2, animation images which summarize the program content are generated; but as the number of images increases, the animation reproduction time grows longer, and moreover the size of the summary content data increases. Hence in order to reduce the size of the summary content data, images are converted into binary values and converted into line drawings to reduce the size of the image data itself; but as indicated by image b shown in FIG. 5 of Patent Reference 2, it is difficult to reliably ascertain the content of video from a line drawing. Further, a method to switch display of animation images with subtitle character strings superposed to images extracted from video is not disclosed. Hence when reproducing animation images, it is thought that a viewer will perform manual operations to switch and display one image at a time in sequence, but such operations are troublesome. Or, it is thought that animation images may be switched automatically at fixed intervals; but depending on the length of the subtitle character string contained in one animation image, there is the possibility that the display will be switched to the next animation image before the viewer has finished reading the subtitle character string.

Thus among methods of generating summary content for digital terrestrial broadcast programs, there is the problem of controlling the timing of switching of animation images for display, such that a viewer can understand subtitle character strings and images when generating animation content in which still images extracted from video data is also displayed, together with switching and display in order of subtitle character strings of the subtitle data. Further, it is preferable that the size of the summary content data be small, and that the reproduction time be short; but it is also important that an amount of information be provided enabling the viewer to understand the content of the original broadcast program merely by viewing the summary content. For this reason, a method of displaying highly readable subtitle character strings, while reducing the number of images used in animation content or the number of times animation images are switched, is desirable.

This invention was devised in light of the above circumstances, and has as an object the provision of a summary content generation device and computer program which enable appropriate control of the timing of switching of animation images for display, when generating animation content as summary content for digital broadcast programs.

SUMMARY OF THE INVENTION

In order to resolve the above problems, a summary content generation device which uses digital broadcast signals having video data and subtitle data to generate summary content for a broadcast program, comprises subtitle character string extraction means, for extracting a subtitle character string from subtitle data contained in digital broadcast signals; still image extraction means, for extracting one still image corresponding to the subtitle character string from the video data contained in the digital broadcast signals; and, summary content generation means, for generating summary content, which displays, on a screen, the extracted subtitle character string together with the corresponding extracted still image; and is characterized in that the summary content generation means decides the timing for switching of the plurality of subtitle character strings and still images comprised by the summary content, based on the subtitle character strings.

A summary content generation device is characterized in that, in the summary content generation means, the time during which a subtitle character string is displayed on the screen (the display time duration) is decided according to the number of characters in the subtitle character string.

A summary content generation device is characterized in that a threshold for the number of characters in a subtitle character string is provided, and the display time duration is lengthened in stages with the threshold as a boundary.

A summary content generation device is characterized in that, in the summary content generation means, the time during which a subtitle character string is displayed on the screen is decided according to the difficulty of words in the subtitle character string.

A summary content generation device is characterized in that, in the summary content generation means, the time during which a subtitle character string is displayed on the screen is decided according to the profile of the viewer.

A summary content generation device is characterized in that, in the summary content generation means, schedule information for displaying subtitles and still images, specifying reproduction times for a plurality of subtitle character strings and still images comprised by the summary content, is created.

A summary content generation device is characterized in that, in the summary content generation means, the possibility of combining a plurality of contiguous subtitle character strings is judged, a plurality of subtitle character strings judged to be combinable are combined, and the combined subtitle character strings is associated with one still image.

A summary content generation device is characterized in that the judgment criteria for combinability of a plurality of contiguous subtitle character strings comprises a judgment criterion 1: that for two subtitle character strings A, B, continuous in the order of subtitle character string A and then subtitle character string B, subtitle character string A does not end with a period.

A summary content generation device is characterized in that the judgment criteria for combinability of a plurality of contiguous subtitle character strings comprises a judgment criterion 2: that for two subtitle character strings A, B, continuous in the order of subtitle character string A and then subtitle character string B, the total number of characters of the subtitle character strings A and B is smaller than a first stipulated number of characters.

A summary content generation device is characterized in that the judgment criteria for combinability of a plurality of contiguous subtitle character strings comprises a judgment criterion 3: that for two subtitle character strings A, B, continuous in the order of subtitle character string A and then subtitle character string B, the time after display of the subtitle character string A until the display of subtitle character string B is shorter than a stipulated time.

A summary content generation device is characterized in that the judgment criteria for combinability of three or more contiguous subtitle character strings comprises a judgment criterion 4: that for three subtitle character strings A, B, C, continuous in the order of subtitle character string A, then subtitle character string B, and then subtitle character string C, the total number of characters of the subtitle character strings A, B and C is greater than a second stipulated number of characters, and moreover that by dividing the combination "A+B+C" of the subtitle character strings A, B, C into two character strings, both the character strings after division have a number of characters smaller than the first stipulated number of characters.

A summary content generation device is characterized in that the division position when dividing a combination of three subtitle character strings satisfying the judgment criterion 4 is decided so as to satisfy any one among the conditions of ending on a punctuation mark, not ending in the middle of a word, or being close to the middle position of the entire character string.

A summary content generation device is characterized in that, in the summary content generation means, a judgment is made as to whether a plurality of continuous still images are similar, and a representative still image is adopted from among a plurality of contiguous similar still images.

A summary content generation device is characterized in that, in the still image extraction means, the first image, the image in the center, or one image selected at random, is extracted, as a still image corresponding to a subtitle character string extracted by the subtitle character string extraction means, from among a candidate image group corresponding to the subtitle character string.

A summary content generation device comprises human detection means which analyzes video data comprised by the digital broadcast signals and detects humans appearing in images, and is characterized in that the still image extraction means extracts images in which humans appear as the still images.

A summary content generation device comprises human detection means which analyzes video data comprised by the digital broadcast signals, detects humans appearing in images, and judges whether the humans are facing forward, and is characterized in that the still image extraction means extracts images in which humans are facing forward as the still images.

A summary content generation device comprises human detection means which analyzes video data comprised by the digital broadcast signals, detects humans appearing in images, and judges whether the humans are facing forward, and facial expression detection means which analyzes the image data and judges the facial expression of a human detected by the human detection means, and is characterized in that the still image extraction means extracts images in which specific facial expressions of humans appear as the still images.

A summary content generation device is characterized in that the specific facial expressions are expressions in which the eyes are open, or are laughing expressions, or are crying expressions.

A summary content generation device comprises title detection means, which analyzes video data comprised by digital broadcast signals and detects whether title data, which is data of character strings inserted on the screen on which video data is displayed, is inserted into images, and is characterized in that the still image extraction means extracts images into which title data has been inserted as the still images.

A summary content generation device comprises anchor shot detection means, which analyzes video data comprised by digital broadcast signals containing images in which appear anchor shots, which are video intervals in which a main newscaster appears in a news program in video data comprised by digital broadcast signals, and which judges whether an anchor shot appears in an image, and is characterized in that the still image extraction means extracts images in which anchor shots appear as the still images.

A computer program is a computer program to generate summary content of a broadcast program using digital broadcast signals having video data and subtitle data, and causes a computer to realize a subtitle character string extraction function of extracting a subtitle character string from subtitle data contained in the digital broadcast signals; a still image extraction function of extracting one still image corresponding to the subtitle character string from the video data contained in the digital broadcast signals; and, a summary content generation function of generating summary content, for the display on a screen of the extracted subtitle character string together with the corresponding extracted still image; and is characterized in that the summary content generation function decides the timing for switching between a plurality of subtitle character strings and still images comprised by the summary content, based on the subtitle character strings.

By this means, a computer can be utilized to realize the above-described summary content generation device.

According to this invention, the timing for switching of display of a plurality of subtitle character strings and still images comprised by summary content is decided based on the subtitle character strings. For example, the timing for display switching is decided according to the number of characters in the subtitle character string, the difficulty of words in the subtitle character string, and similar. By this means, there is the advantageous result that, when generating animation content as summary content of a digital broadcast program, the timing for switching the animation images for display can be controlled appropriately.

BRIEF DESCRIPTION OF THE DRAWINGS

FIG. 5 is an example of the configuration of subtitle/still image display schedule information;

FIG. 7 is an example of the configuration of subtitle/still image display schedule information;

FIG. 8 is an example of the configuration of subtitle/still image display schedule information;

FIG. 10 is an example of the configuration of subtitle/still image display schedule information;

FIG. 12 is an example of the configuration of subtitle/still image display schedule information;

FIG. 13 is an example of the configuration of subtitle/still image display schedule information;

FIG. 14 is an example of the configuration of subtitle/still image display schedule information;

FIG. 17 is an example of the configuration of subtitle/still image display schedule information;

DETAILED DESCRIPTION OF THE INVENTION

Figure 1:
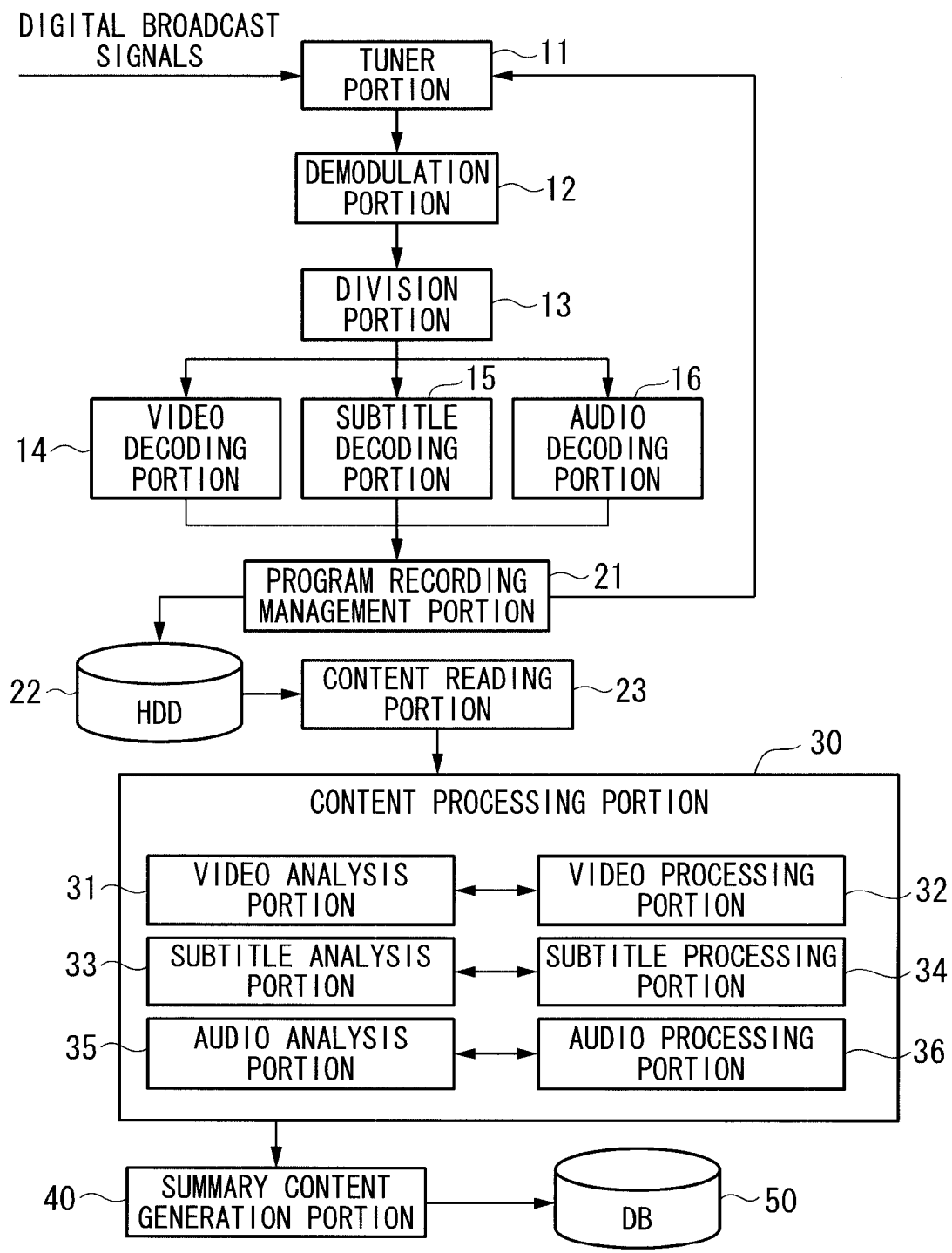
FIG. 1 is a block diagram showing the overall configuration of the digital broadcast reception system.

Below, aspects of the invention are explained, referring to the drawings.

FIG. 1 is a block diagram showing the overall configuration of the digital broadcast reception system. In FIG. 1, digital broadcast signals received via an antenna or similar are input to the digital broadcast reception system. As the digital broadcast, for example, broadcasts which use digital terrestrial broadcast, digital satellite broadcast, or other broadcast transmissions, or broadcasts using the Internet (IP communication network) called IP (Internet Protocol) broadcasts, and similar can be employed. In this aspect, an example is explained for the case of digital terrestrial broadcasts.

Digital terrestrial broadcast signals have video data, audio data, and subtitle data. Subtitle data has subtitle character strings to be displayed on a television screen. In digital terrestrial broadcast signals, the subtitle data is placed at positions according to the timing of reproduction of the video data together with which the subtitle character string of the subtitle is to be displayed. Hence while reproducing video data and audio data using received digital terrestrial broadcast signals, a digital terrestrial broadcast reception terminal superposes subtitle character strings in subtitle data onto video at the time the subtitle data is received.

Figures 2, 3:
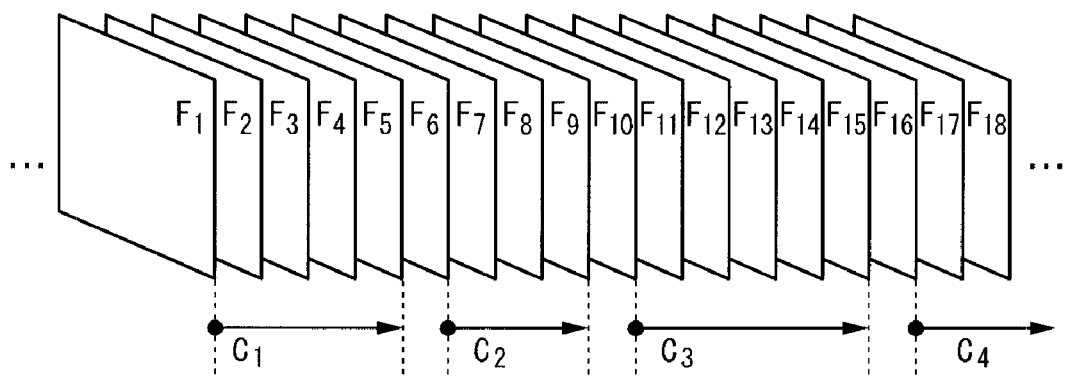
FIG. 2 is a conceptual diagram showing the relation between video data and subtitle data displayed on a television screen, for digital terrestrial broadcast signals.
FIG. 3 is an example of a time schedule table for digital terrestrial broadcast signals.

FIG. 2 is a conceptual diagram showing the relation between video data and subtitle data displayed on a television screen, for digital terrestrial broadcast signals. In FIG. 2, during video reproduction, at the time subtitle data containing a subtitle character string with for example the subtitle number $C_1$ is received, the frame image has the frame image number $F_1$, and thereafter, when subtitle data containing a subtitle character string with the subtitle number $C_2$ is received, the frame image has the frame image number $F_6$. In this way, a plurality of frame images (frame image numbers $F_j$) correspond to one subtitle character string (subtitle number $C_i$). Upon receiving new subtitle data, the digital terrestrial broadcast reception terminal erases the subtitle character string which had until then been displayed, and displays the newly received subtitle character string. From this, the relation between subtitle data and video data can be represented by a time schedule table such as that shown in FIG. 3, which associates subtitle character strings, display times for subtitle character strings, and frame image series for superposed display of subtitle character strings. In digital terrestrial broadcasts, subtitle data is inserted into the digital terrestrial broadcast signals with a minimum interval of 2 seconds. Hence when for example the broadcast time of a program is 30 minutes, subtitle data can be inserted up to a calculated maximum of approximately 900 times. However, in actual digital terrestrial broadcasts, the number of times subtitle data is inserted in a 30-minute program is approximately 300 to 400 times, and the total number of characters in subtitle character strings is approximately 4000 to 6000 characters.

First, the configuration of the digital broadcast reception system shown in FIG. 1 is explained.

The tuner portion 11 receives broadcast signals in one channel among all digital terrestrial broadcast signals, and outputs the signals to the demodulation portion 12. The reception channel is a channel selected by the viewer, and is passed to the tuner portion 11 via the program recording management portion 21. The demodulation portion 12 demodulates the broadcast signals received from the tuner portion 11, and outputs demodulated signals to the separation portion 13. The separation portion 13 separates the demodulated signals into video data, subtitle data, and audio data. The video data is sent to the video decoding portion 14. Subtitle data is sent to the subtitle decoding portion 15. Audio data is sent to the audio decoding portion 16. The video decoding portion 14 decodes the video data. The subtitle decoding portion 15 decodes the subtitle data. The audio decoding portion 16 decodes the audio data. The decoded video data, subtitle data, and audio data are sent to the program recording management portion 21.

Each of the portions 11 to 16 of these digital terrestrial broadcast reception functions are similar to those in a digital terrestrial broadcast reception terminal of the prior art. A digital terrestrial broadcast reception terminal further comprises a video display portion, which displays video data decoded by the video decoding portion 14; a character information display portion, which displays subtitle character strings in subtitle data decoded by the subtitle decoding portion 15; and an audio reproduction portion, which reproduces audio data decoded by the audio decoding portion 16.

The program recording management portion 21 passes the channel selected by the viewer to the tuner portion 11. The program recording management portion 21 records the video data, subtitle data, and audio data received from the decoding portions 14, 15, 16 on a hard disk device (HDD) 22, as the content of a single program. Hence program content comprises video data, subtitle data, and audio data.

Program content can be freely generated by the viewer. For example, each time the viewer switches the channel, signals may be recorded as different program content on the hard disk device 22. Or, as a result of an instruction from the viewer, signals may be recorded on the hard disk as different program content from the time of the instruction.

The content reading portion 23 reads program content from the hard disk device 22, and outputs the content to the content processing portion 30. The read-out program content can be freely selected by the viewer. The content reading portion 23 can send read-out program content to a content reproduction portion, not shown, to cause reproduction of the program content on a display device.

The content processing portion 30 comprises a video analysis portion 31, video processing portion 32, subtitle analysis portion 33, subtitle processing portion 34, audio analysis portion 35, and audio processing portion 36.

The video analysis portion 31 analyzes the video data of the program content. The video processing portion 32 processes video data based on the video data analysis results. The video processing portion performs processing to, for example, discriminate and select still images to use in generating summary content, from among all the frame images in the video data received from the content reading portion 23.

The subtitle analysis portion 33 analyzes the subtitle data of the program content. The subtitle processing portion 34 processes subtitle data based on the subtitle data analysis results. The subtitle processing portion performs processing to, for example, decide the character string for display upon each animation switching of the summary content, for each of the subtitle character strings in the subtitle data received from the content reading portion 23.

The audio analysis portion 35 analyses the audio data of the program content. The audio processing portion 36 processes audio data based on the audio data analysis results. The audio processing portion performs processing to, for example, extract and edit only the necessary audio data when audio data is to be inserted into the summary content.

On the other hand, even when audio data is not inserted when generating summary content, audio data is used as judgment criteria when discriminating and selecting still images to summarize all the frame images. For example, by comparing voice recognition results with subtitles, video scene switching can be judged, or speakers can be distinguished from the voice recognition results, to classify subtitles by speaker, judge video data scene switching, or perform other processing.

The summary content generation portion 40 generates summary content in cooperation with the content processing portion 30. Summary content is generated for the content of one program. Summary content comprises still images from among the video data (hereafter called "summary still images"), subtitle character strings from among the subtitle data (hereafter called "summary character strings"), and schedule information (hereafter called "subtitle/still image display schedule information") for reproducing the summary still images and summary character strings. Audio data may also be contained in the summary content. The viewer can choose whether audio content is contained in the summary content.

The database 50 stores summary content created by the summary content generation portion 40.

Next, details of operations to generate summary content in this aspect are explained.

Figure 4:
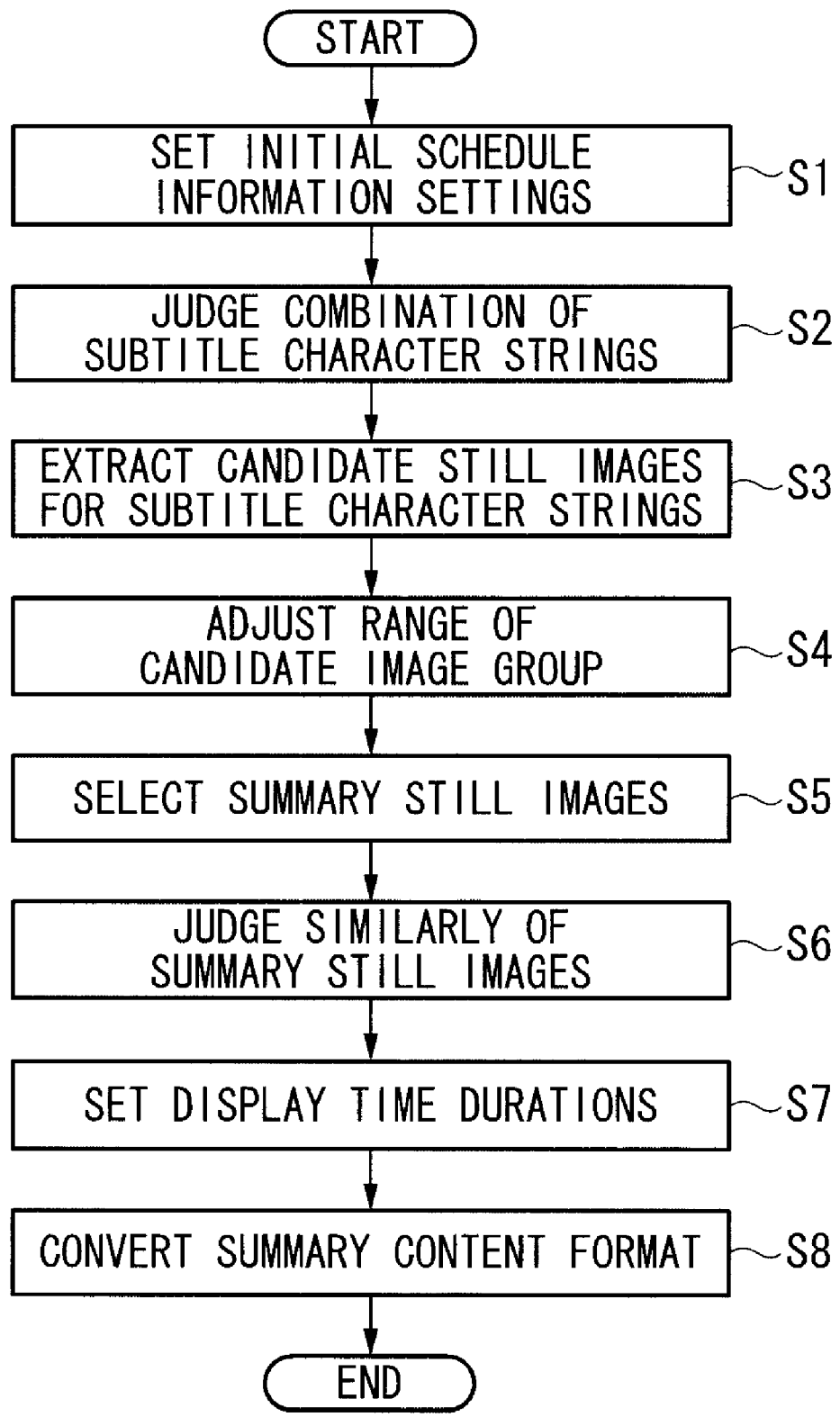
FIG. 4 is a flowchart showing a procedure for generation of summary content.

FIG. 4 is a flowchart showing the procedure for generation of summary content in the aspect. Below, operations in each step of the procedure shown in FIG. 4 (steps S1 to S8) are explained.

The summary content generation portion 40 performs the processing of each step in FIG. 4 in cooperation with the content processing portion 30. The summary content generation portion 40 cooperates with the video analysis portion 31 and video processing portion 32 in processing of video data of the program content. The summary content generation portion 40 cooperates with the subtitle analysis portion 33 and subtitle processing portion 34 in processing of subtitle data of the program content. And, when audio data is contained in the summary content, the summary content generation portion 40 cooperates with the audio analysis portion 35 and audio processing portion 36 in processing of audio data of the program content.

(Step S1: Making Initial Settings of Schedule Information)

The summary content generation portion 40 makes initial settings for the subtitle/still image display schedule information. In these initial settings, first subtitle character strings $T_n$ (where n is an identification number (1, 2, 3, ...) for a subtitle character string) comprised by the subtitle data are detected for all the subtitle data in the program content to be processed. All the characters in one subtitle character string $T_n$ are displayed simultaneously, superposed on the video. Next, for each subtitle character string $T_n$, subtitle numbers $C_m$ (where m=1, 2, 3, ...) are assigned, in the order of display. Next, the display time for each subtitle character string $T_n$ is indicated as the elapsed time from the start of reproduction of the program content. Next, the sets of subtitle numbers $C_m$, display times, and subtitle character strings $T_n$ are included in the subtitle/still image display schedule information. FIG. 5 shows an example of the configuration of subtitle/still image display schedule information 100. In the stage of this step S1, all of the subtitle character strings $T_n$ in the content of the program being processed are extracted, and only the sets of subtitle numbers $C_m$, display times, and subtitle character strings $T_n$ for each subtitle character string $T_n$ are stored in the subtitle/still image display schedule information 100.

(Step S2: Judgment of Combination of Subtitle Character Strings)

Each of the subtitle character strings in the subtitle data need not necessarily constitute a single sentence by itself. Here, a "sentence" means a character string with a period at the end. In a broadcast program, in some cases sentences are divided according to the conversation between humans appearing in the program or other aspects of the video progress, and a single sentence is formed from a plurality of continuous subtitle character strings. Further, the intervals of reception of subtitle data is indefinite during the progress of the video. For example, while in some cases the next subtitle data may be received after an extremely short interval such as approximately 2 seconds, in other cases the next subtitle data may not be received even after 10 or more seconds have elapsed. Based on this, in the present aspect a judgment is made as to whether a plurality of contiguous subtitle character strings can be combined, and subtitle character strings which are judged to be combinable are combined.

First, the summary content generation portion 40 judges, for the subtitle character strings in the subtitle/still image display schedule information 100, whether a plurality of contiguous subtitle character strings can be combined. Below, judgment criteria for judging whether two contiguous subtitle character strings (for convenience of explanation, taken to be subtitle character strings A and B, contiguous in the order A, B) can be combined are described.

Judgment Criterion 1: Subtitle character string A does not end with a period.

Judgment criterion 2: The total number of characters in the subtitle character strings A, B is smaller than a first stipulated number of characters.

Judgment criterion 3: The time after display of the subtitle character string A until the display of subtitle character string B is shorter than a stipulated time TIM1 (for example, 4.0 seconds).

Figure 6:
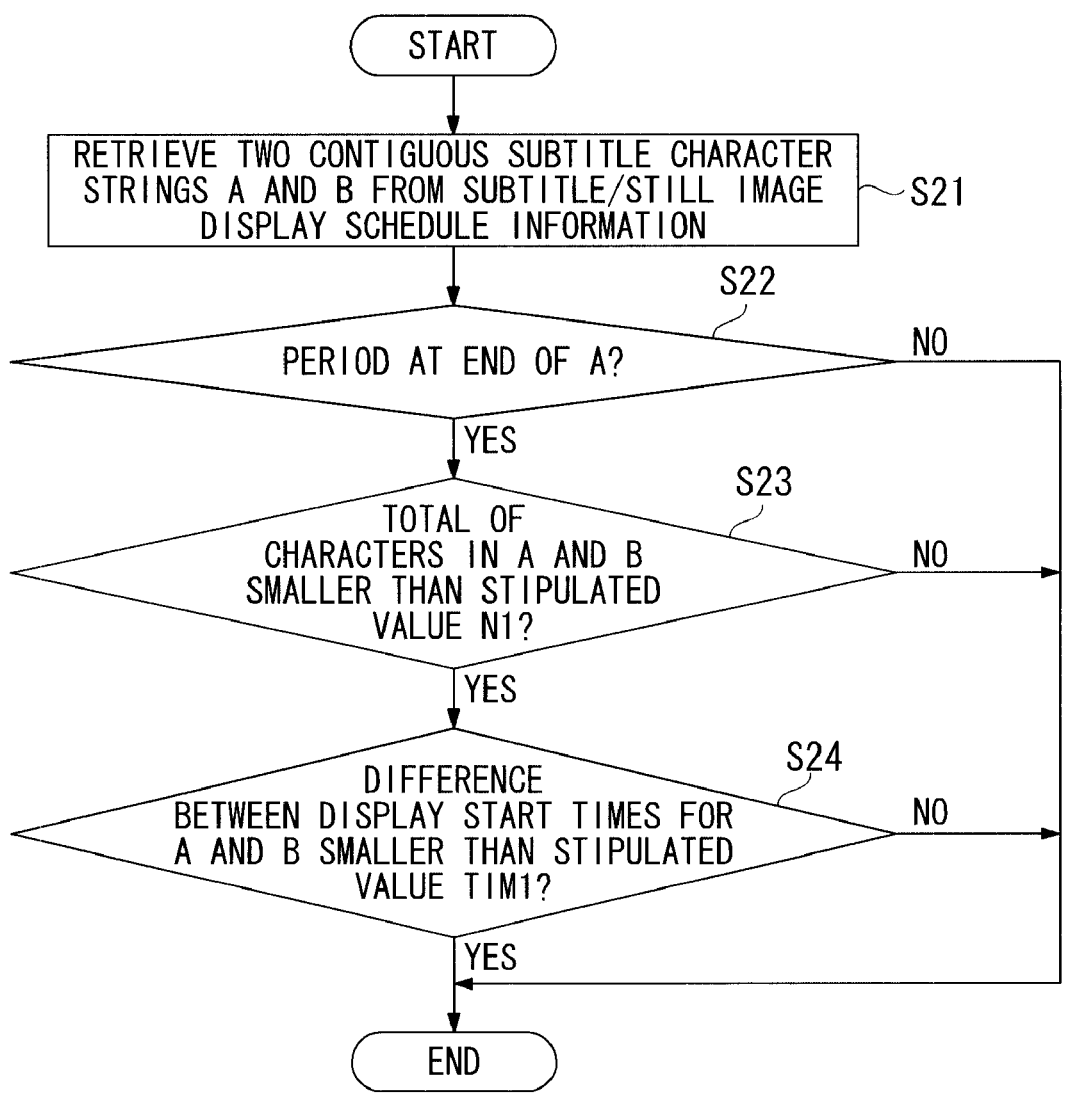
FIG. 6 is a flowchart showing the flow of processing for subtitle character string combination judgment.

The summary content generation portion 40 performs combination judgment processing for subtitle character strings according to the procedure described in FIG. 6 (steps S21 to S24). FIG. 6 is a flowchart showing the flow of combination judgment processing for subtitle character strings in this aspect. In FIG. 6, first, in step S21 two contiguous subtitle character strings A, B are retrieved from the subtitle/still image display schedule information 100. In step S22, the judgment criterion 1 is used to verify whether there is a period at the end of subtitle character string A. In step S23, the judgment criterion 2 is used to verify whether the total number of characters in the subtitle character strings A and B is smaller than the stipulated number of characters N1. In step S24, the judgment criterion 3 is used to verify whether the difference in the display start times of the subtitle character strings A and B is shorter than the stipulated time TIM1. If the verifications of these steps S22, S23, S24 are all passed, and the subtitle character strings A and B satisfy all the judgment criteria 1, 2 and 3, then the two contiguous subtitle character strings A and B are combined, and are treated as a single subtitle character string to update the subtitle/still image display schedule information 100.

FIG. 7 is an example of the subtitle character string combination processing results for the subtitle/still image display schedule information 100 of FIG. 5. In the example of FIG. 7, it is judged that the subtitle character strings $T_1$, $T_2$ of FIG. 5 can be combined, and so the subtitle character string of the set with the subtitle number $C_1$ is modified to the combination "$T_1+T_2$" combining the subtitle character strings $T_1$ and $T_2$, and the information for the set with the subtitle number $c_2$ (the display time and subtitle character string) is deleted. Similarly, it is judged that the subtitle character strings $T_6$ and $T_7$ in FIG. 5 can be combined, and so the subtitle character string of the set with subtitle number $C_6$ is modified to the combination "$T_6+T_7$" combining the subtitle character strings $T_6$ and $T_7$, and the information for the set with the subtitle number $C_7$ (the display time and subtitle character string) is deleted.

In the above-described examples, cases were described in which two contiguous subtitle character strings are combined; however, the above judgment criteria may be used to judge whether three or more subtitle character strings can be combined, and combination performed accordingly.

In the processing flow of FIG. 6 described above, the subtitle character strings A and B were combined only when the subtitle character strings A and B satisfied all of the judgment criteria 1, 2 and 3; however, a method may be employed in which the subtitle character strings A and B are combined when any one of, or a plurality of, the judgment criteria 1, 2, 3 are satisfied.

Further, Further, in addition to the combination rules of the above-described judgment criteria 1, 2 and 3, as a second combination rule, combinability may be judged when the following judgment criterion 4 is satisfied.

Judgment criterion 4: For three contiguous subtitle character strings A, B, C, the total number of characters thereof is greater than a second stipulated number of characters N2, and moreover by dividing the combination "A+B+C" of the subtitle character strings A, B, C into two character strings, both the character strings after division have a number of characters smaller than the first stipulated number of characters.

According to this second combination rule, the summary content generation portion combines three contiguous subtitle character strings, and then divides the result into two character strings, and updates the subtitle/still image display schedule information 100. FIG. 8 is an example of processing results, using the second combination rule, of the subtitle/still image display schedule information 100 of FIG. 7. In the example of FIG. 8, the total number of characters of the subtitle character strings $T_8$, $T_9$, $T_{10}$ in FIG. 7 is greater than the second stipulated number of characters N2, and after combining the subtitle character strings $T_8$, $T_9$, $T_{10}$, upon dividing the result into two character strings $T_8'$ and $T_8''$, both of the character strings $T_8'$ and $T_8''$ have a number of characters smaller than the first stipulated number of characters N1. Hence the subtitle character string of the set with the subtitle number $C_8$ is changed to the character string after division $T_8'$, and in addition the subtitle character string of the set with the subtitle number $C_9$ is changed to the character string after division $T_8''$, and the information (display time and subtitle character string) of the set with subtitle number $C_{10}$ is deleted.

In the second combination rule, the position for division when dividing the result of combination of the subtitle character strings may, for example, be decided so as to satisfy any one the conditions that (1) division occurs at a punctuation mark, (2) division does not occur in the middle of a word, and (3) division occurs close to the middle position of the entire length of the character string.

The summary content generation portion 40 performs sequential combination judgments from the beginning of the subtitle character strings, according to the display order, for all of the subtitle character strings in the subtitle/still image display schedule information 100, combines the combinable subtitle character strings, and updates the subtitle/still image display schedule information 100.

(Step S3: Extraction of Candidate Image Groups for Subtitle Character Strings)

The summary content generation portion 40 extracts a frame image group (hereafter called a "candidate image group") to serve as candidates for summary still images for each of the subtitle character strings in the subtitle/still image display schedule information 100, from the video data of the content of the program being processed, based on the display times in the subtitle/still image display schedule information 100.

In general, a subtitle character string is displayed somewhat earlier than the progress of the video. However, in a live broadcast program, subtitle character strings may be displayed after the video. Hence there is the possibility that the content of the video and the subtitle character string may not coincide. That is, despite the fact that the video scene has not been switched, the subtitle character string for the next video scene may in some cases be displayed. Or, despite the fact that the video scene has been switched, the subtitle character string displayed may in some cases be for the preceding video scene.

Figure 9:
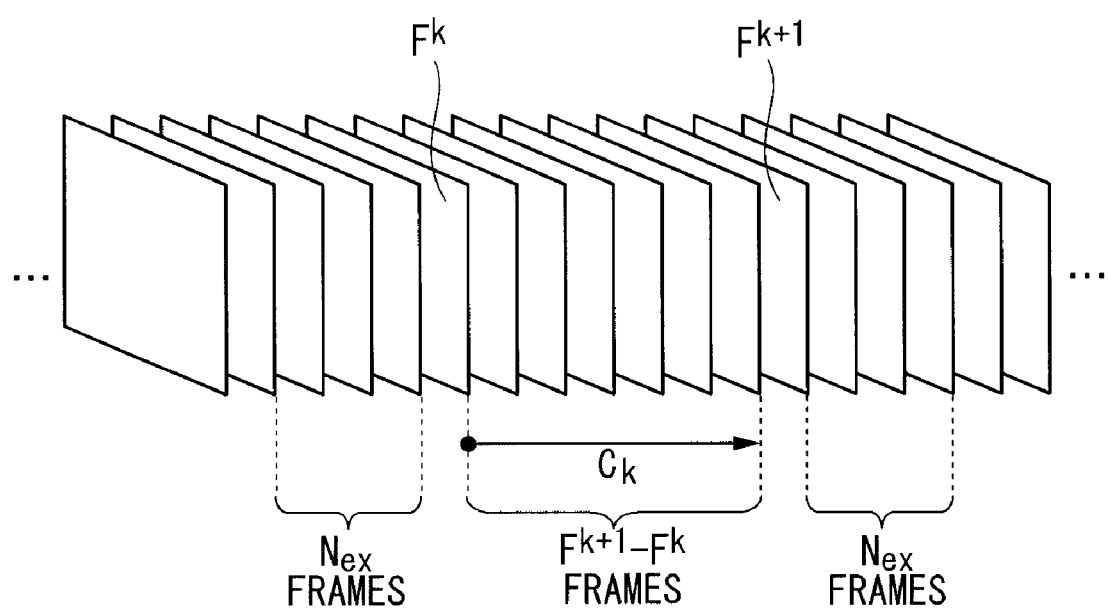
FIG. 9 is a conceptual diagram of extraction of a candidate image group.

Based on this knowledge, in this aspect extraction of candidate image group for each subtitle character string is performed from a broader display time interval for the subtitle character string. That is, when the display time for a set with subtitle number $C_k$ is $t_k$, and the display time for the set with the next subtitle number $C_{k+1}$ is $t_{k+1}$, frame images existing between display time $t_k$ and display time $t_{k+1}$ are extracted from the video data, and in addition, $N_{ex}$ frame images from before time $t_k$, and $N_{ex}$ frame images from after time $t_{k+1}$, are also extracted. Here $N_{ex}$ is an integer greater than or equal to 0. FIG. 9 is a conceptual diagram of extraction of a candidate image group for subtitle number $C_k$. In FIG. 9, when the frame image numbers corresponding to the display times of the subtitle numbers $C_k$ and $C_{k+1}$ are $F^k$ and $F^{k+1}$ respectively, the candidate image group for subtitle number $C_k$ is from frame image number $F^k-N_{ex}$ to $F^{k+1}+N_{ex}-1$.

The summary content generation portion extracts a candidate image group for each subtitle character string in the subtitle/still image display schedule information 100 from the video data of the program content, as described above. Then, for each subtitle character string, the summary content generation portion 40 stores a frame image number series, indicating the candidate image group, as information for the set of the subtitle character string in the subtitle/still image display schedule information 100. FIG. 10 shows an example of the subtitle/still image display schedule information 100, with frame image number series indicating candidate image groups for each subtitle character string. The example of FIG. 10 is for a case in which, in the above step S2, the subtitle character string for the set with the subtitle number $C_8$ in the subtitle/still image display schedule information 100 of FIG. 7 is also modified to the character string "$T_8+T_9+T_{10}$" by combining the subtitle character strings $T_8$, $T_9$, and $T_{10}$.

(Step S4: Adjustment of the Range of Candidate Image Groups)

Figure 11:
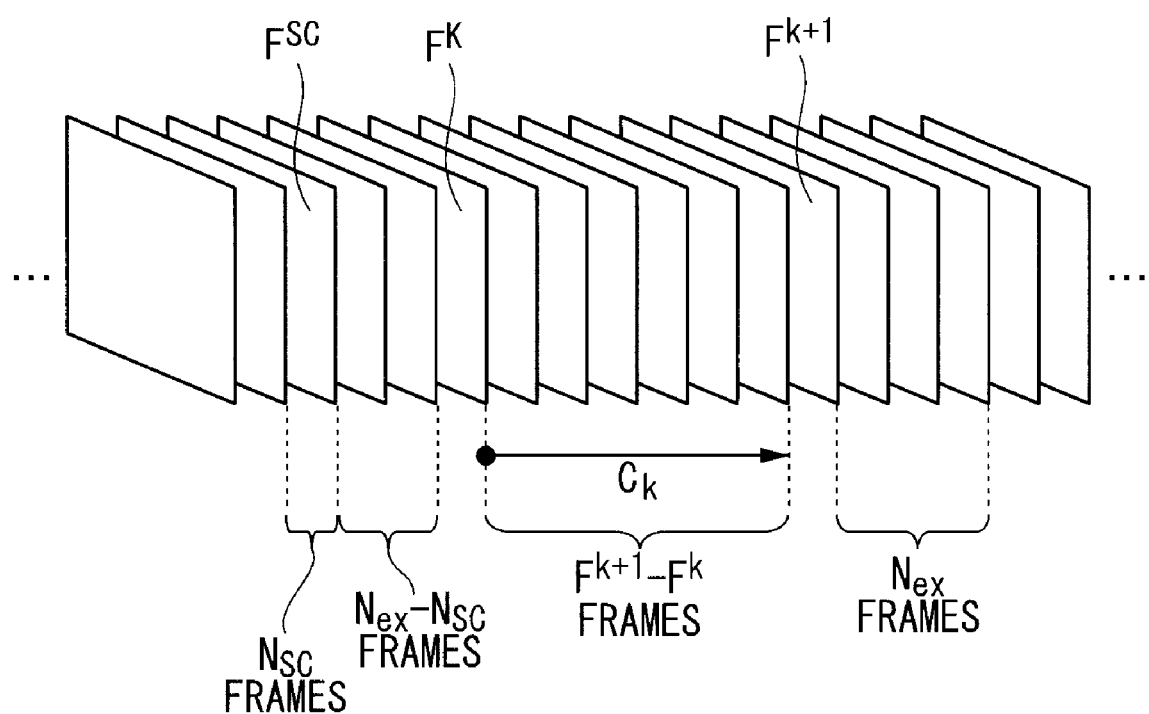
FIG. 11 is a conceptual diagram of range adjustment of a candidate image group.

The summary content generation portion 40 deletes frame images which are inappropriate for use as summary still images for a subtitle character string from the candidate image group (frame image group) indicated by a frame image number series in the subtitle/still image display schedule information 100. This is because, in digital terrestrial broadcasts, there is some amount of deviation between the progress of the video and the display of subtitle character strings, so that there are cases in which the video content and the subtitle character string content do not coincide. Hence when there exists a switch in video scenes among a candidate image group, the first-half portion or second-half portion of the video scene switch in the candidate image group is deleted. FIG. 11 is a conceptual diagram of adjustment of the range of a candidate image group. In FIG. 11, when it is judged for the candidate image group of a subtitle number $C_k$ that a scene switch occurs at the time of frame $N_{SC}$ in the first-half portion, the frame images of the first-half portion are deleted from the candidate image group. FIG. 12 shows an example of processing results for the subtitle/still image display schedule information 100 of FIG. 10. In the example of FIG. 12, the 20 frame images of the first-half portion of the candidate image group (the frame image number series "1565-1959") for the subtitle number $C_8$ in FIG. 10 are deleted, and as shown in FIG. 12, the candidate image group for subtitle number $C_8$ is changed to the frame image number series "1585-1959".

(Step S5: Selection of Summary Still Images)

The summary content generation portion 40 selects one summary still image from among the candidate image group indicated by the frame image number series in the subtitle/still image display schedule information 100. As the method of selecting the summary still image, for example, (1) the first image can be selected, (2) the image in the middle can be selected, or (3) an image can be selected at random.

The summary content generation portion 40 selects a summary still image for each subtitle character string in the subtitle/still image display schedule information 100. Then, the summary content generation portion 40 stores the frame image number of the summary still image for each subtitle character string, as information for the set of each subtitle character string, in the subtitle/still image display schedule information 100. FIG. 13 shows an example of processing results for the subtitle/still image display schedule information 100 of FIG. 12.

(Step S6: Judgment of Similarity of Summary Still Images)

With respect to summary still images selected in step S5 above, there are cases in which contiguous summary still images are similar. For example, there are cases in which two contiguous summary still images are both scenes of a newscaster reading a script, or in some other way present the same video scene, or capture the same object. Based on such knowledge, in this aspect, when a plurality of contiguous summary still images are similar, by selecting one of the summary still images as a representative summary still image, the subtitle/still image display schedule information 100 is modified such that there is no switching of the display for this plurality of contiguous summary still images.

First, the summary content generation portion 40 judges whether two contiguous summary still images P, Q in the subtitle/still image display schedule information 100 are similar. When, as the result, the images are judged to be similar, the summary content generation portion 40 updates the subtitle/still image display schedule information 100 such that there is no switching of the display from the summary still image P to the summary still image Q.

FIG. 14 shows an example of the processing result for the subtitle/still image display schedule information 100 of FIG. 13. In the example of FIG. 14, because the summary still frame of the set with subtitle number $C_3$ (frame image number series "1189") and the summary still image of the set with subtitle number $C_4$ (frame image number series "1278") in FIG. 13 are similar, the frame image number of the summary still image of the set with subtitle number $C_4$ is deleted, as shown in FIG. 14. By this means, even when there is a switch in subtitle display from the subtitle character string $T_6$ of the set with subtitle number $C_3$ to the subtitle character string $T_4$ of the set with subtitle number $C_4$, the summary still image displayed together with the subtitle character strings remains unchanged as the summary still image of the set with subtitle number $C_3$ (frame image number series "1189"), and the same summary still image continues to be displayed.

In the above-described example, a case was considered in which two summary still images are similar; similarly in a case in which three or more contiguous summary still images are similar, the subtitle/still image display schedule information 100 may be modified such that there is no switching of the summary still image display.

(Step S7: Setting Display Times)

The "display times" in the subtitle/still image display schedule information 100 created in the stages up to the above step S6 are assigned based on the time of the original broadcast program. That is, if the broadcast time of the original broadcast program is 30 minutes, then when the summary content (subtitle character strings and summary still images) are reproduced according to these "display times", then the time for reproduction of the summary content is also 30 minutes. On the other hand, the speed and comprehension with which subtitle character strings are read differ among viewers, and in particular, when words of high difficulty are contained in subtitle character strings, differences may become prominent.

Based on such knowledge, in this aspect a "reproduction time" at which reproduction of subtitle character strings and summary still images is started is set for the subtitle/still image display schedule information 100, so that the summary content can be reproduced in a short time, and so that viewers can easily understand the broadcast content. A number of examples of methods for setting "reproduction times" are explained below.

<Reproduction Time Setting Method 1>

When the time over which the summary content is to be reproduced (the reproduction time duration) is specified, this reproduction time duration is divided equally by the number of subtitle character strings in the subtitle/still image display schedule information 100. Then, the reproduction times for each of the subtitle character strings are set in the subtitle/still image display schedule information 100 according to the equally divided reproduction time duration. When using this method, the time over which each subtitle character string is displayed on the television screen (the display time duration) is the same. And, reproduction of the summary content can be completed, for example, within a reproduction time duration specified by the viewer.

Or, the reproduction times for each subtitle character string may be set in the subtitle/still image display schedule information 100 such that for all the subtitle character strings, the display time is constant and equal to a stipulated value TIM2. In the case of this method also, the time over which each subtitle character string is displayed on the television screen is the same.

<Reproduction Time Setting Method 2>

The time over which a subtitle character string in the subtitle/still image display schedule information 100 is displayed on the television screen (the display time duration) is decided according to the number of characters in the subtitle character string.

(Reproduction Time Setting Method 2-1)

Figure 15:
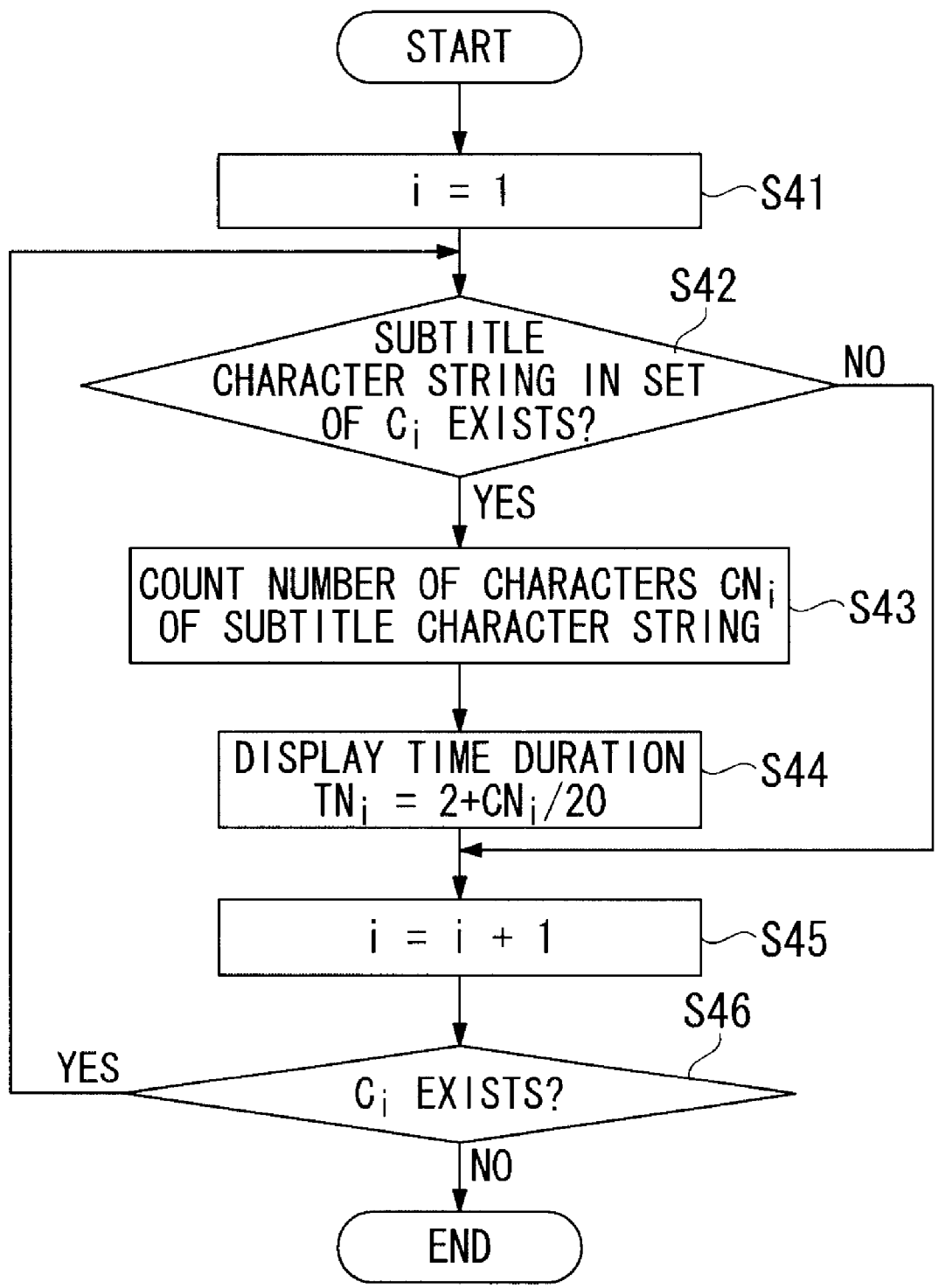
FIG. 15 shows the flow of processing in one example of a reproduction time setting method.

In reproduction time setting method 2-1, reproduction times are set for each subtitle character string such that the greater the number of characters in the subtitle character string, the longer is the display time duration. FIG. 15 shows the processing flow in this case. In the processing of FIG. 15, the display time durations are calculated for all of the subtitle character strings in the subtitle/still image display schedule information 100. In step S41 of FIG. 15, the variable i is set to the initial value "1". In step S42, the existence of a subtitle character string in a set with subtitle number $C_i$ is checked. If a subtitle character string in a set with subtitle number $C_i$ exists, processing proceeds to step S43; if a subtitle character string in a set with subtitle number $C_i$ does not exist, processing proceeds to step S45. In step S43, the number of characters $CN_i$ in the subtitle character string of the set with subtitle number $C_i$ is counted. In step S44, the display time $TN_i$ (in seconds) of the subtitle character string of the set with subtitle number $C_i$ is calculated. The calculation formula used is $TN_i = 2 + (CN_i/20)$. In step S45, the variable i is incremented by 1. In step S46, the existence of a subtitle number $C_i$ in the subtitle/still image display schedule information 100 is checked. If the subtitle number $C_i$ exists in the subtitle/still image display schedule information 100, processing returns to step S42. If on the other hand the subtitle number $C_i$ does not exist in the subtitle/still image display schedule information 100, and processing of all subtitle numbers $C_i$ is ended, then processing ends. The display times for each subtitle character string are set in the subtitle/still image display schedule information 100 according to the display time durations $TN_i$ for each of the subtitle character strings calculated by the processing of FIG. 15.

(Reproduction Time Setting Method 2-2)

In the reproduction time setting method 2-2, a threshold value for the number of characters in a subtitle character string is provided, and the display time is lengthened in stages with the threshold value as a boundary.

If the number of characters in a subtitle character string is equal to or less than a stipulated value N3, then the display time duration for the subtitle character string is set to a stipulated value TIM3. If on the other hand the number of characters in the subtitle character string exceeds the stipulated value N3, then the display time duration for the subtitle character string is set to a stipulated value TIM4. Here, the stipulated value TIM4 is a longer time duration than the stipulated value TIM3. The stipulated values may be, for example, N3=12, TIM3=2 seconds, and TIM4=4 second. The reproduction times for each subtitle character string are set in the subtitle/still image display schedule information 100 according to the display time durations of each of the subtitle character strings.

In the case of the above-described reproduction time setting method 2-1, the overall reproduction time duration varies according to the sum of the number of characters in all the subtitle character strings. The display time for subtitle character strings differs according to the number of characters, so that an effective reproduction time duration can be set, and the certainty that a viewer will read to the end of the subtitles is increased.

<Reproduction Time Setting Method 3>

When words of high difficulty are contained in a subtitle character string in the subtitle/still image display schedule information 100, the time over which the subtitle character string is displayed on the television screen (the display time duration) is decided according to this difficulty. For example, the display time duration for a subtitle character string not containing words of high difficulty may be a prescribed value (for example, a value determined by the above reproduction time setting method 1 or reproduction time setting method 2). And, the display time duration for a subtitle character string containing words of high difficulty may be a value increased from this prescribed value (for example, a value increased by a prescribed fraction, or a value resulting by adding a fixed value). And, the reproduction times for the subtitle character strings are set in the subtitle/still image display schedule information 100 according to the display time durations for each of the subtitle character strings.

A "word of high difficulty" refers to a highly specialized word, such as a word in the fields of politics, economics law, medicine, and similar. Words of high difficulty are stored in advance in a database, and by referencing the database, a judgment as to whether a subtitle character string contains a word of high difficulty can be made.

In the case of this reproduction time setting method 3, the total reproduction time duration varies according to the number of subtitle character strings containing words of high difficulty. And, by changing the display time duration of a subtitle character string according to the presence or absence of words of high difficulty, effective reproduction time durations can be set, and moreover the certainty that subtitles will be understood by a viewer increases.

Figure 16:
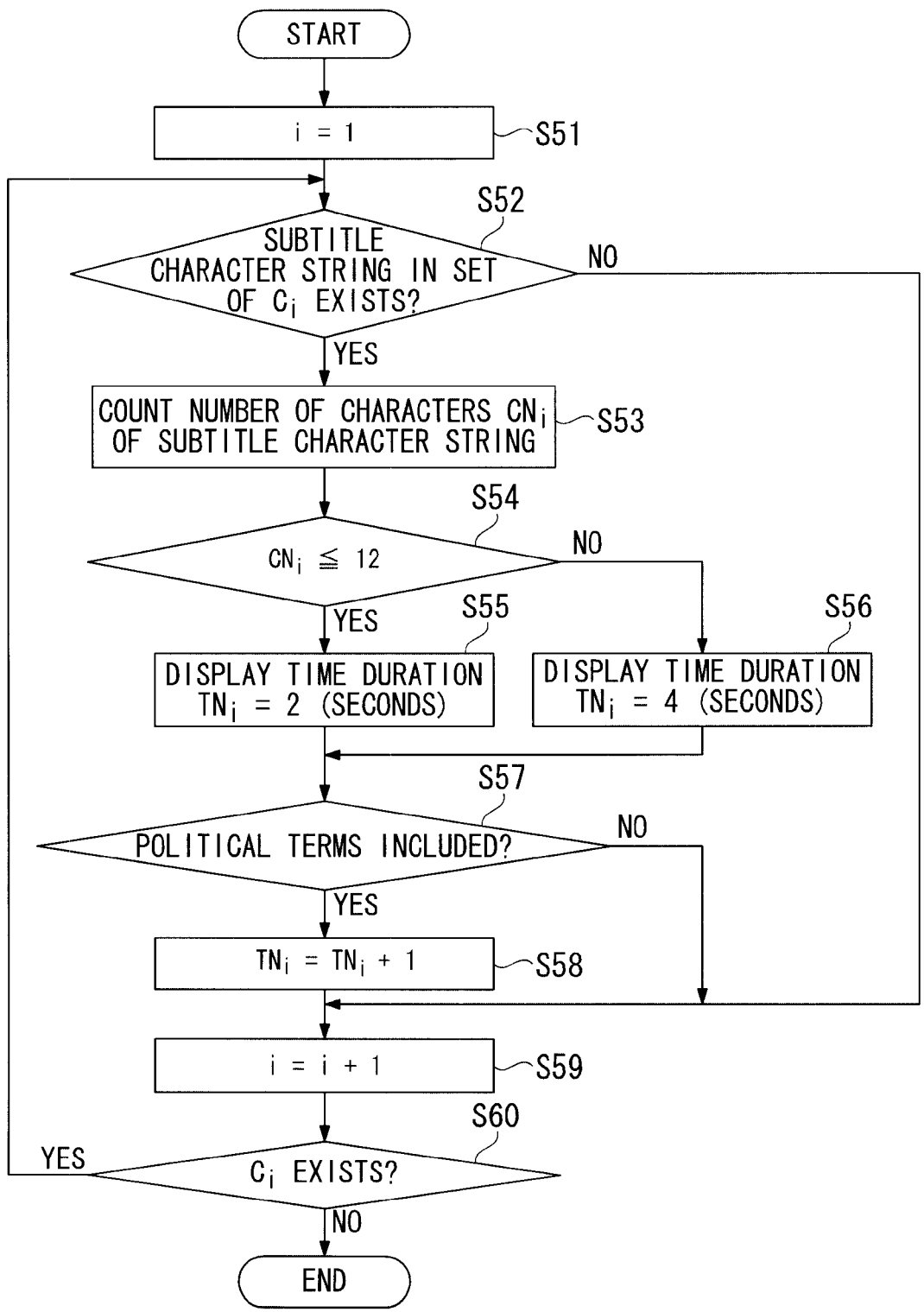
FIG. 16 shows the flow of processing in another example of a reproduction time setting method.

FIG. 16 shows the flow of processing combining the above-described reproduction time setting method 2-2 and this reproduction time setting method 3. In the processing of FIG. 16, first, display time durations are decided in stages for all of the subtitle character strings in the subtitle/still image display schedule information 100, using the threshold value for the number of characters in a subtitle character string. Then, the display time durations thus decided are increased for subtitle character strings containing words of high difficulty. In the example of FIG. 16, stipulated values relating to the reproduction time setting method 2-2 are N3=12, TIM3=2 seconds, and TIM4=4 seconds. As the words of high difficulty, political terms are used, and a database of political terms is prepared.

In step S51 of FIG. 16, the variable i is set to the initial value of "1". In step S52, the existence of a subtitle character string for a set with subtitle number $C_i$ is checked. If a subtitle character string exists for a set with subtitle number $C_i$, processing proceeds to step S53; if no subtitle character string exists for a set with subtitle number $C_i$, processing proceeds to step S59. In step S53, the number of characters $CN_i$ in the subtitle character string of the set with subtitle number $C_i$ is counted. In step S54, a judgment is made as to whether the number of characters $CN_i$ is less than or equal to the stipulated value N3 of "12". If the number of characters $CN_i$ is less than or equal to the stipulated value N3 of "12", processing proceeds to step S55, and the display time duration $TN_i$ of the subtitle character string for the set with the subtitle number $C_i$ is set to the stipulated value TIM3 of "2 seconds". If on the other hand the number of characters $CN_i$ exceeds the stipulated value N3 of "12", processing proceeds to step S56, and the display time duration $TN_i$ of the subtitle character string for the set with subtitle number $C_i$ is set to the stipulated value TIM4 of "4 seconds".

Next, in step S57 the subtitle character string of the set with subtitle number $C_i$ is checked for the presence of political terms. In this investigation, the existence in the database of political terms of character combinations is checked for all combinations of characters in the subtitle character string. If some combination of characters exists in the database of political terms, it is judged that a political term exists in the subtitle character string. When as a result a political term is contained in the subtitle character string, processing proceeds to step S58, and 1 second is added to the display time duration $TN_i$ for the subtitle character string of the set with subtitle number $C_i$ as decided in step S55 or S56. If on the other hand no political terms are contained in the subtitle character string, processing proceeds to step S59.

In step S59, the variable i is incremented by 1. In step S60, the existence in the subtitle/still image display schedule information 100 of a subtitle number $C_i$ is checked. If the subtitle number $C_i$ exists in the subtitle/still image display schedule information 100, processing returns to step S52. If on the other hand the subtitle number $C_i$ does not exist in the subtitle/still image display schedule information 100, and processing of all subtitle numbers $C_i$ is ended, then processing ends. The display times for each subtitle character string are set in the subtitle/still image display schedule information 100 according to the display time durations $TN_i$ for each of the subtitle character strings calculated by the processing of FIG. 16.

<Reproduction Time Setting Method 4>

The time during which a subtitle character string is displayed on the television screen (the display time duration) is decided according to profile information for the viewer (age, sex, occupation, and similar). A reproduction time duration database is created, using fields of profile information such as age and occupation as search keys, and the display time duration corresponding to the profile information for the viewer is retrieved from the database. The display time duration database can be such that, for example, display time durations are longer for the elderly and for children. Profile information for the viewer is either recorded in advance, or is input manually by the viewer as appropriate. Reproduction times for each subtitle character string are then set in the subtitle/still image display schedule information 100 according to the display time durations decided in this way. In the case of this method, the overall reproduction time duration changes with the profile of the viewer. Also, the reproduction time durations of subtitle character strings change according to the viewer profile, so that an effective reproduction time duration can be set, and moreover the certainty of understanding of subtitles by the viewer is increased.

As another method of setting reproduction times other than those described above, for example, the reading comprehension of the viewer may be inferred, and the display time durations set according to the inference results. As a method of inferring the reading comprehension of a viewer, for example, when the summary content generation device automatically generates summary content (animation), operations by the user to adjust the reproduction speed (for example, fast-forwarding, rewinding, pausing, and similar) may be recorded, and from the recorded contents the reading comprehension of the viewer according to a prescribed criterion may be judged. Or, the overall reading comprehension of the viewer may be judged taking into account the difficulty of words, number of characters, and similar in displayed subtitle character strings.

The summary content generation portion 40 sets reproduction times for each subtitle character string in the subtitle/still image display schedule information 100 using any one of, or a combination of, the above reproduction time setting methods 1, 2, 3, 4. FIG. 17 shows an example of processing results for the subtitle/still image display schedule information 100 of FIG. 14. The example of FIG. 17 is for a case of using the reproduction time setting method 2-2. In the example of FIG. 17, the reproduction time for the subtitle character string of the set with the leading subtitle number $C_1$ is set to the initial value "00:00:00", and the reproduction times of subsequent subtitle character strings are set by cumulatively adding the display time durations of the preceding subtitle character strings. Because only the subtitle character string "$T_8+T_9+T_{10}$" of the set with subtitle number $C_8$ exceeds the 12 characters of the stipulated value N3, the display time duration is "4 seconds (stipulated value TIM4)". The subtitle character strings of the sets with other subtitle numbers have numbers of characters equal to or less than 12 characters, which is the stipulated value N3, and so the display time durations are "2 seconds (stipulated value TIM3)".

By means of the stages up to this step S7, subtitle character strings serving as summary character strings, summary still images, and reproduction times for the summary character strings and summary still images, are set as summary content in the subtitle/still image display schedule information 100. The reproduction times are the timing for switching of display of the summary character strings (summary character string display switching timing), or the timing for switching of summary still images (summary still image display switching timing).

(Step S8: Summary Content Format Conversion)

The summary content generation portion 40 converts each of the summary still images indicated in the subtitle/still image display schedule information 100 into an image format according to the specifications of the reproduction device (summary content reproduction device) which is to reproduce the summary content. For example, if a portable telephone set is the summary content reproduction device, and the resolution when displaying the summary content is 240 horizontal pixels by 80 vertical pixels, then the summary still images are subjected to image processing so as to obtain this resolution. The summary content generation portion 40 then records in the database 50, as summary content for a single program, the summary still images after image format conversion and subtitle character strings indicated by the subtitle/still image display schedule information 100, and the subtitle/still image display schedule information 100.

In the above steps S1 to S8, summary content is created for the content of a single program. A summary content reproduction device reads summary content from the database 50, superposes subtitle character strings in the summary content onto the relevant summary still images, and reproduces the results. On the occasion of this reproduction, the subtitle character strings and summary still images are switched according to the reproduction times in the subtitle/still image display schedule information 100.

In the above aspect, summary content was generated comprising three types of data, which were summary still images, subtitle character strings, and the subtitle/still image display schedule information; however, these three data types may be converted into an animation image format and generated as a single content package. By this means, summary content may be generated according to the specifications of the summary content reproduction device.

Also, the animation method when switching summary still images and subtitle character strings may be specified at the beginning of summary content generation, and may be described within the subtitle/still image display schedule information. For example, when switching between summary still images, animation methods may be specified, such as for example zooming, slide-ins, dissolves, and other special effects.

In the above-described aspect, summary content was stored temporarily in the database 50; however, summary content may be output directly from the summary content generation portion 40 to a summary content reproduction device, and the summary content reproduced by the summary content reproduction device.

By means of the above-described aspect, the following advantageous results are obtained.

(1) By generating, for a digital terrestrial broadcast program, summary content as animation content which displays still images extracted from video data, together with the switched display in order of subtitle character strings among the subtitle data, a viewer can reproduce the summary content and, while reading the subtitle character strings, can view the still images, to understand by simple means the content of the program.

(2) By processing digital terrestrial broadcast data to generate summary content using subtitle data and still image groups extracted from video data, the size of the summary content data can be made small compared with the broadcast data.

(3) by deciding the timing of animation switching based on the results of analysis of subtitle character strings and still images, readability by viewers is improved.

(4) By combining a plurality of subtitle character strings, or changing the display timing according to the profiles of individual viewers, viewer readability and comprehension are improved.

(5) When contiguous still images are similar, by omitting some images, the number of still images and the number of animation switching times can be reduced, and the size of the summary content data and reproduction time duration can be reduced.

The content processing portion 30 and summary content generation portion 40 of this aspect may be realized by dedicated hardware, or may comprise a personal computer or other computer system, in which, by executing a program to realize each of the functions of the portions 30 and 40 shown in FIG. 1, those functions are realized.

Further, a program to realize each of the steps shown in FIG. 4 may be recorded on computer-readable recording media, and by using a computer to read and execute the program recorded on this recording media, processing to generate summary content may be performed. Here, a "computer system" may comprise an OS and peripheral equipment or other hardware.

Further, "computer-readable recording media" means a flexible disk, magneto-optical disk, ROM, flash memory, or other writable nonvolatile memory, or a DVD (Digital Versatile Disk) or other transportable media, or a hard disk drive or similar incorporated into a computer system or other recording device.

Further, "computer-readable recording media" also includes media which holds the program for a fixed length of time, such as for example volatile memory (for example DRAM (Dynamic Random Access Memory)) within a computer system serving as a server or client when the program is transmitted over the Internet or another network, telephone lines, or other communication circuits.

Further, the program may be transmitted from a computer system in a storage device or similar of which this program is stored, via transmission media, or via transmission waves in transmission media, to another computer system. Here, the "transmission media" through which the program is transmitted is media having functions for transmission of information, such as the Internet or another network (communication network), or telephone circuits or other communication circuits (communication lines).

Further, the program may be a program which realizes a portion of the above-described functions. Also, a program may be a program which, combined with a program already recorded in a computer system, realizes the above-described functions, that is, a so-called difference file (difference program).

In the above, an aspect of the invention has been explained in detail referencing the drawings; however, specific configurations are not limited to this aspect, and design modifications which do not deviate from the gist of the invention are included.

For example, in the above aspect, an example of a digital terrestrial broadcast was explained, but application to digital satellite broadcasts, IP broadcasts, and similar is also possible.

Further, each of the portions in FIG. 1 can for example be mounted in a set-top box for digital broadcasts, a personal computer receiving IP broadcasts, and similar.

Also, methods other than those described above for selection of summary still images in step S5 of FIG. 4 may be used. Here, a number of examples are explained of other methods for summary still image selection in step S5 of FIG. 4.

Here, examples (methods A and B) are explained of methods for selecting one summary still image from among the candidate image group indicated by a frame image number series in the subtitle/still image display schedule information 100 based on the image content.

(Method A)

The content of images adopted as summary still images are any one of (a) through (e) below.

(a) Images in which a human appears; (b) images in which a human is facing forward; (c) images in which a human is facing forward, and the eyes are open; (d) images in which a human is facing forward, and is laughing; (e) images in which a human is facing forward, and is crying.

When employing this method A, the video analysis portion 31 in FIG. 1 comprises a human detection function and a facial expression detection function. The human detection function analyzes the image data, and detects the appearance of a human in the image. Further, the human detection function judges whether a detected human is facing forward. The facial expression detection function analyzes the video data and judges the facial expression of a human detected by the human detection function. When, as a summary still image, (a) images in which humans appear or (b) images in which humans appear and are facing forward are adopted, there is no need to judge the facial expressions of humans, and so the video analysis portion 31 need not comprise a facial expression detection function.

Figure 18:
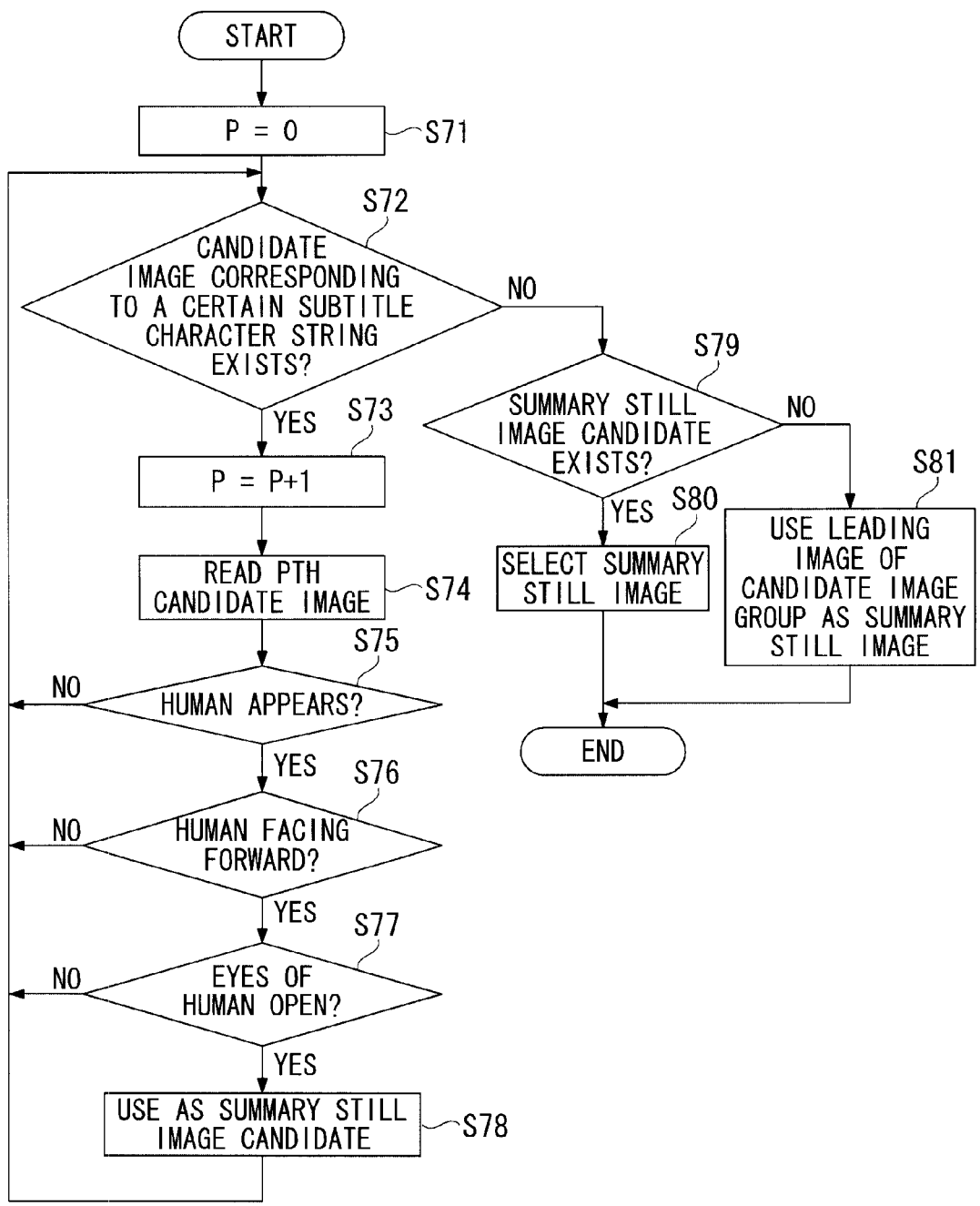
FIG. 18 shows the flow of processing in one example of a summary still image selection method; and, FIG. 19 shows the flow of processing in another example of a summary still image selection method.

FIG. 18 shows the flow of processing when adopting, as summary still images, images in which a human is facing forward with eyes open. In FIG. 18, processing is shown in which a summary still image corresponding to a certain subtitle character string in the subtitle/still image display schedule information 100 is selected. In the processing of FIG. 18, judgments as to whether a human is facing forward with eyes open are made for all of the candidate images in the candidate image group corresponding to a certain subtitle character string. In step S71 of FIG. 18, the variable P is set to the initial value "0". In step S72, a judgment is made as to whether there remains a candidate image, among the candidate image group corresponding to the subtitle character string for selection of a summary still image, for which a judgment as to whether a human is facing forward with eyes open has riot yet been made. If as a result there remains a candidate image for which a judgment has not yet been made, processing proceeds to step S73, and if judgments have been made for all candidate images, processing proceeds to step S79. In step S73, the variable P is incremented by 1. In step S74, the Pth candidate image in the candidate image group is read into the video analysis portion 31 from the HDD 22.

In step S75, a judgment is made as to whether a human is present in the Pth candidate image. Here, the video analysis portion 31 analyzes the read-in candidate image, and detects a human in the image. If as a result a human is detected, processing proceeds to step S76, and if a human is not detected, processing returns to step S72.

In step S76, a judgment is made as to whether the human detected n the Pth candidate image is facing forward. Here, the video analysis portion 31 analyzes the candidate image, and judges whether the detected human is facing forward. If as a result the human is facing forward, processing proceeds to step S77, and if not facing forward, processing returns to step S72.

In step S77, a judgment is made as to whether the human detected in the Pth candidate image has his or her eyes open. Here, the video analysis portion 31 analyzes the candidate image, and judges whether the detected human, who is facing forward, has his or her eyes open. If as a result the human has his or her eyes open, processing proceeds to step S78, and if his or her eyes are not open, processing returns to step S72.

In step S78, because in the Pth candidate image a human is facing forward with eyes open, the Pth candidate image is recorded as a candidate for a summary still image.

In step S79, a judgment is made as to whether a summary still image candidate exists. If as a result a summary still image candidate exists, processing proceeds to step S80, and one summary still image is selected from among the summary still image candidates. At this time, an arbitrary candidate may be selected. If on the other hand there is no summary still image candidate, processing proceeds to step S81, and the leading candidate image from the candidate image group is used as the summary still image.

(Method B)

The content of images adopted as summary still images are any one among (f) and (g) below.

(f) An image into which title data is inserted. Title data is contained in image data within digital terrestrial broadcast signals. Title data has a prescribed data format, and can be detected from video data. Title data is the data of a character string inserted on a television screen displaying video data. Title data comprises character strings displayed on the television screen, but is separate from the subtitle data of this invention, and differs from the subtitle character strings of this invention.

(g) An image in which an anchor shot appears. An anchor shot is a video interval in which a main newscaster appears in a news program.

When as summary still images, (f) images into which title data is inserted are adopted, the video analysis portion 31 in FIG. 1 comprises a title detection function. A title detection function analyzes video data and detects whether title data is inserted into images.

When as summary still images, (g) images in which an anchor shot appears are adopted, the video analysis portion 31 in FIG. 1 comprises an anchor shot detection function. An anchor shot detection function analyzes video data and judges whether an anchor shot appears in images.

Figure 19:
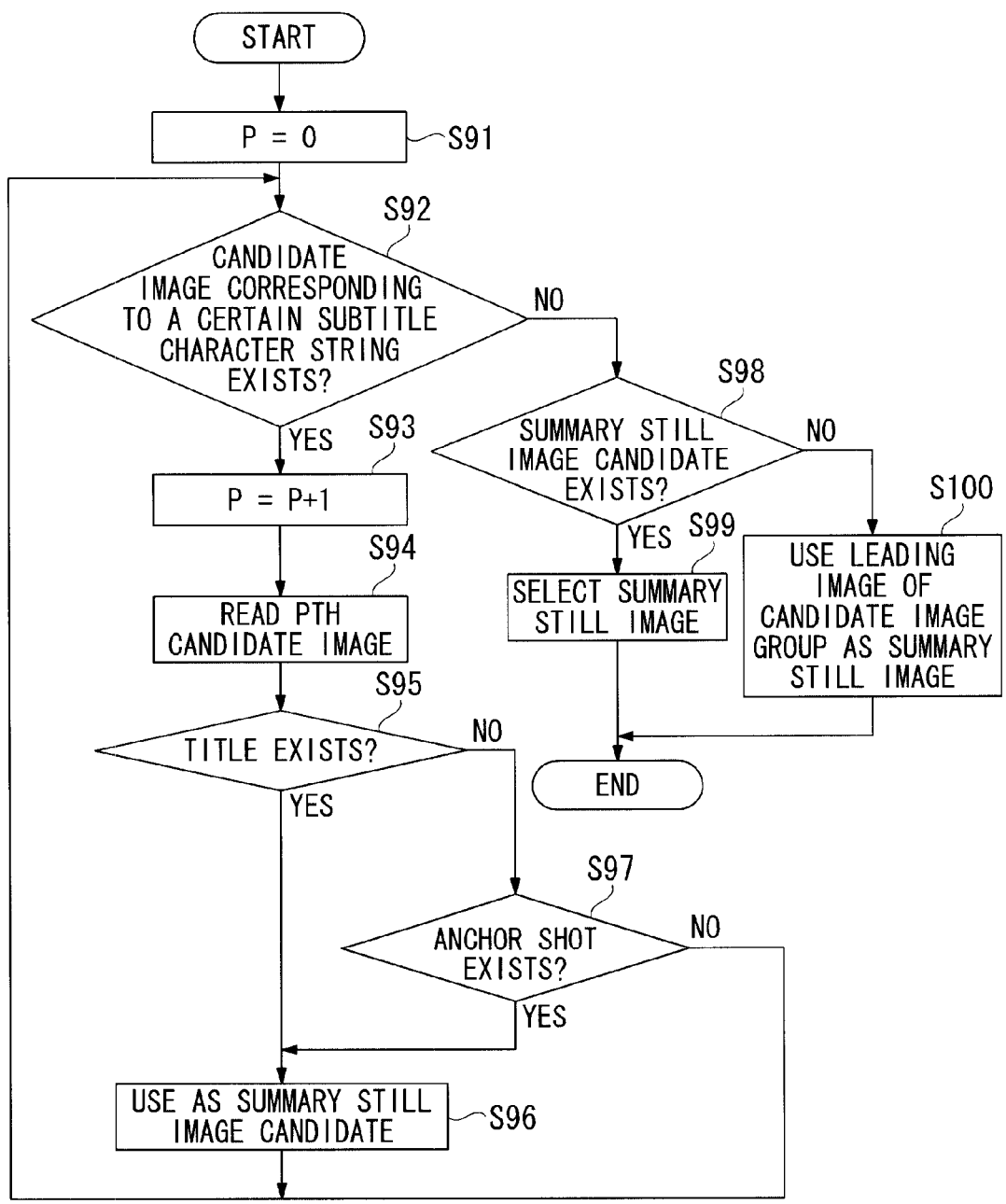

FIG. 19 shows the flow of processing when adopting, as summary still images, images into which title data is inserted or images in which anchor shots appear. In this case, the video analysis portion 31 comprises both a title detection function and an anchor shot detection function. FIG. 19 shows processing to select a summary still image corresponding to a certain subtitle character string in the subtitle/still image display schedule information 100. In the processing of FIG. 19, a judgment is made, for all of the candidate images in the candidate image group corresponding to the certain subtitle character string, whether title data is inserted or an anchor shot appears. In step S91 of FIG. 19, the variable P is set to the initial value "0". In step S92, a judgment is made as to whether there exists a candidate image, in the candidate image group corresponding to the subtitle character string for summary still image selection, for which a judgment as to whether title data is inserted or an anchor shot appears has not yet been made. If as a result there remains a candidate image for which a judgment has not yet been made, processing proceeds to step S93, and if judgments have been made for all candidate images, processing proceeds to step S98. In step S93, the variable P is incremented by 1. In step S94, the Pth candidate image of the candidate image group is read from the HDD 22 into the video analysis portion 31.

In step S95, a judgment is made as to whether title data is inserted into the Pth candidate image. Here, the video analysis portion 31 analyzes the read-in candidate image, and detects whether title data is inserted into the image. If as a result title data is detected, processing proceeds to step S96, and the Pth candidate image is recorded as a candidate for a summary still image. Then, processing returns to step S92. If on the other hand title data is not detected, processing proceeds to step S97.

In step S97, a judgment is made as to whether an anchor shot appears in the Pth candidate image. Here, the video analysis portion 31 analyzes the read-in candidate image, and judges whether an anchor shot appears in the image. If as a result an anchor shot appears, processing proceeds to step S96, and the Pth candidate image is recorded as a candidate for a summary still image. Then, processing returns to step S92. If on the other hand an anchor shot is not detected, processing returns immediately to step S92.

In step S98, a judgment is made as to whether a summary still image candidate exists. If as a result a summary still image candidate exists, processing proceeds to step S99, and one summary still image is selected from the summary still image candidates. At this time, a candidate may be selected arbitrarily. If on the other hand there are no summary still image candidates, processing proceeds to step S100, and the leading candidate image of the candidate image group is used as the summary still image.

What is claimed is:

1. A summary content generation device, which uses digital broadcast signals having video data and subtitle data to generate summary content for a broadcast program, comprising:
   a subtitle character string extraction unit, for extracting a subtitle character string from subtitle data contained in said digital broadcast signals;
   a still image extraction unit, for extracting one still image corresponding to said subtitle character string from video data contained in said digital broadcast signals; and
   a summary content generation unit, for generating summary content, which displays, on a screen, said extracted subtitle character string together with said corresponding extracted still image, wherein
   said summary content generation unit decides the timing for switching display of the plurality of subtitle character strings and still images comprised by said summary content, based on the subtitle character strings.

2. The summary content generation device according to claim 1, wherein said summary content generation unit decides the time during which a subtitle character string is displayed on the screen (the display time duration) according to the number of characters in the subtitle character string.

3. The summary content generation device according to claim 2, wherein a threshold for the number of characters in a subtitle character string is provided, and the display time duration is lengthened in stages with the threshold as a boundary.

4. The summary content generation device according to claim 1, wherein said summary content generation unit decides the time during which a subtitle character string is displayed on the screen according to the difficulty of words in the subtitle character string.

5. The summary content generation device according to claim 1, wherein said summary content generation unit decides the time during which a subtitle character string is displayed on the screen according to a profile of the viewer.

6. The summary content generation device according to claim 1, wherein said summary content generation unit creates schedule information for displaying subtitles and still images, specifying reproduction times for a plurality of subtitle character strings and still images comprised by said summary content.

7. The summary content generation device according to claim 1, wherein said summary content generation unit judges the possibility of combining a plurality of contiguous subtitle character strings, combines a plurality of subtitle character strings judged to be combinable, and associates combined subtitle character strings with one still image.

8. The summary content generation device according to claim 7, wherein judgment criteria for combinability of a plurality of contiguous subtitle character strings comprises a judgment criterion 1: that for two subtitle character strings A, B, continuous in the order of subtitle character string A and then subtitle character string B, subtitle character string A does not end with a period.

9. The summary content generation device according to claim 7, wherein judgment criteria for combinability of a plurality of contiguous subtitle character strings comprises a judgment criterion 2: that for two subtitle character strings A, B, continuous in the order of subtitle character string A and then subtitle character string B, the total number of characters of the subtitle character strings A and B is smaller than a first stipulated number of characters.

10. The summary content generation device according to claim 7, wherein judgment criteria for combinability of a plurality of contiguous subtitle character strings comprises a judgment criterion 3: that for two subtitle character strings A, B, continuous in the order of subtitle character string A and then subtitle character string B, the time after display of the subtitle character string A until the display of subtitle character string B is shorter than a stipulated time.

11. The summary content generation device according to claim 7, wherein judgment criteria for combinability of three or more contiguous subtitle character strings comprises a judgment criterion 4: that for three subtitle character strings A, B, C, continuous in the order of subtitle character string A, then subtitle character string B, and then subtitle character string C, the total number of characters of the subtitle character strings A, B and C is greater than a second stipulated number of characters, and moreover that by dividing the combination "A+B+C" of the subtitle character strings A, B, C into two character strings, both the character strings after division have a number of characters smaller than the first stipulated number of characters.

12. The summary content generation device according to claim 11, wherein the division position when dividing a combination of three subtitle character strings satisfying said judgment criterion 4 is decided so as to satisfy anyone among the conditions of ending on a punctuation mark, not ending in the middle of a word, or being close to the middle position of the entire character string.

13. The summary content generation device according to claim 1, wherein said summary content generation unit judges whether a plurality of continuous still images are similar, and adopts a representative still image from among a plurality of contiguous similar still images.

14. The summary content generation device according to claim 1, wherein said still image extraction unit extracts the first image, the image in the center, or one image selected at random, as a still image corresponding to a subtitle character string extracted by said subtitle character string extraction unit, from among a candidate image group corresponding to the subtitle character string.

15. The summary content generation device according to claim 1, comprising human detection unit which analyzes video data comprised by said digital broadcast signals and detects humans appearing in images, and wherein said still image extraction unit extracts images in which humans appear as said still images.

16. The summary content generation device according to claim 1, comprising human detection unit which analyzes video data comprised by said digital broadcast signals, detects humans appearing in images, and judges whether the humans are facing forward, and wherein said still image extraction unit extracts images in which humans are facing forward as said still images.

17. The summary content generation device according to claim 1, comprising human detection unit which analyzes video data comprised by said digital broadcast signals, detects humans appearing in images, and judges whether the humans are facing forward, and facial expression detection unit which analyzes the image data and judges the facial expression of a human detected by said human detection unit, and wherein said still image extraction unit extracts images in which specific facial expressions of humans appear as said still images.

18. The summary content generation device according to claim 17, wherein said specific facial expressions are expressions in which the eyes are open, or are laughing expressions, or are crying expressions.

19. The summary content generation device according to claim 1, comprising title detection unit, which analyzes video data comprised by said digital broadcast signals and detects whether title data, which is data of character strings inserted on the screen on which video data is displayed, is inserted into images, and wherein said still image extraction unit extracts images into which title data has been inserted as said still images.

20. The summary content generation device according to claim 1, comprising anchor shot detection unit, which analyzes video data comprised by said digital broadcast signals and judges whether anchor shots, which are video intervals in which a main newscaster appears in a news program in video data comprised by said digital broadcast signals, appear in images, and wherein said still image extraction unit extracts images in which anchor shots appear as said still images.

21. A computer readable non-transitory medium storing a computer program, to generate summary content of a broadcast program using digital broadcast signals having video data and subtitle data, causing a computer to realize:
 a subtitle character string extraction function of extracting a subtitle character string from subtitle data contained in said digital broadcast signals;
 a still image extraction function of extracting one still image corresponding to said subtitle character string from the video data contained in said digital broadcast signals; and
 a summary content generation function of generating summary content, for the display on a screen of said extracted subtitle character string together with said corresponding extracted still image,
 wherein
 said summary content generation function decides the timing for switching between a plurality of subtitle character strings and still images comprised by said summary content, based on the subtitle character strings.

* * * * *